(12) United States Patent
Ishikawa

(10) Patent No.: US 6,542,631 B1
(45) Date of Patent: Apr. 1, 2003

(54) ENCODING METHOD OF A COLOR IMAGE AND ITS ENCODING DEVICE AND A DECODING METHOD OF THE COLOR IMAGE AND ITS DECODING DEVICE

(75) Inventor: Masaki Ishikawa, Hino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/157,248

(22) Filed: Sep. 18, 1998

(30) Foreign Application Priority Data

Nov. 27, 1997 (JP) .............................................. 9-326517

(51) Int. Cl.$^7$ ............................ G06K 9/00; G06K 9/34; G06K 9/36; G06K 9/38; G06K 9/46
(52) U.S. Cl. ........................ 382/162; 382/166; 382/164; 382/171; 382/173; 382/232; 382/246; 382/253
(58) Field of Search ................................ 382/162–253; 258/515–523

(56) References Cited

U.S. PATENT DOCUMENTS 5,768,403 A * 6/1998 Suzuki et al. ............... 382/165
5,805,735 A * 9/1998 Chen et al. .................. 382/239
5,930,387 A * 7/1999 Chan et al. .................. 382/166
6,016,360 A * 1/2000 Nguyen et al. ............. 382/166
6,115,496 A * 9/2000 Nguyen et al. ............. 382/166

* cited by examiner

*Primary Examiner*—Leo Boudreau
*Assistant Examiner*—Amir Alavi
(74) *Attorney, Agent, or Firm*—Oliff & Berridge, PLC

(57) ABSTRACT

The invention improves the refresh rate and minimizes the memory for display when reproducing a color image. A color image encoding device has a creation device which counts the number of colors used in color image data and creates a global palette which lists corresponding indexes when the number of colors is a specified value or less, a block division device which divides the color image data into a plurality of blocks, a local palette creation device which creates a local palette which lists indexes in the global palette when the number of colors in a block is less than the number of colors in the global palette, and a color index assigning device which assigns the indexes in the global palette to the input pixels when the number of colors is the same as the number of colors in the global palette, and assigns the indexes in the local palette to the input pixels when the numbers of colors is different from the number of colors in the global palette.

4 Claims, 16 Drawing Sheets

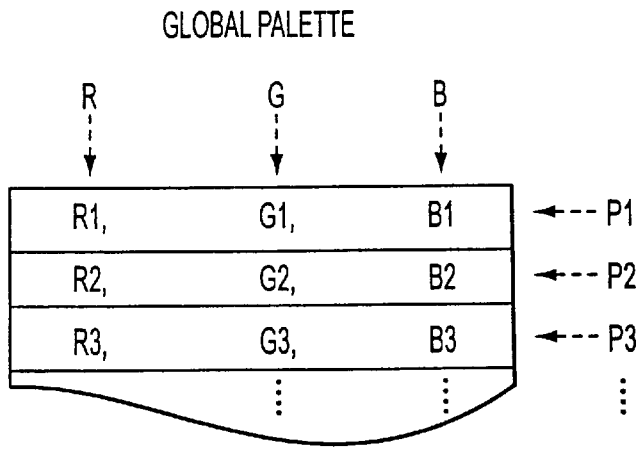
FIG. 2
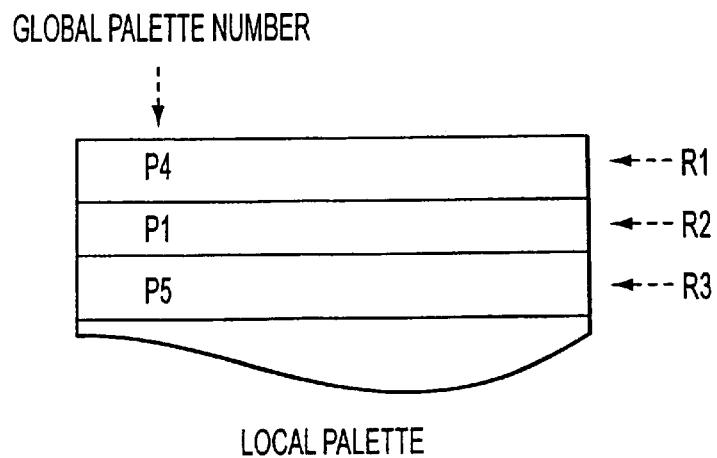
FIG. 3
FIG. 4(A)          FIG. 4(B)

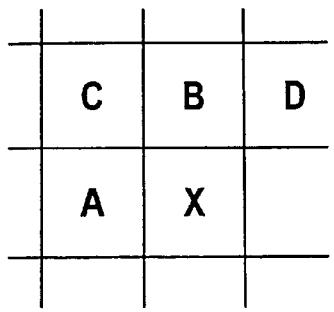
FIG. 8(A)
| CODE DATA / SAME COLOR | L1 | L2 | COLOR INDEX (C) | NUMBER OF BITS REQUIRED |
|---|---|---|---|---|
| A | 0 | — | — | 1 |
| B | 1 | 0 0 | — | 3 |
| C | 1 | 0 1 | — | 3 |
| D | 1 | 1 0 | — | 3 |
| N/A | 1 | 1 1 | CX | 3 | INDEX CODE |
FIG. 8(B)
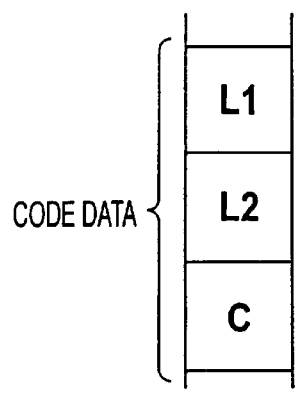
FIG. 8(C)

| MEANING / DATA | COLOR INDEX (= C) | RUN (= L) |
|---|---|---|
| LINE IS ALL WHITE | 0 | 0 |
| COPY MODE | 0 | OTHER THAN 0 |
| ORDINARY THING | OTHER THAN 0 | OTHER THAN 0 |

| 3 | 3 | 3 | 4 | 4 | 3 | 3 | X | ◎ | ◎ | △ | △ | 1 | 1 | 1 | 1 | 1 |
| 1 | 1 | 5 | 5 | 5 | 4 | 4 | X | ◎ | ◎ | △ | 3 | 4 | 4 | – | – | – |

FIG. 10(A)

| COLOR INDEX (=C) | 1 | 5 | 4 | 0 | 3 | 4 | 0 |
|---|---|---|---|---|---|---|---|
| RUN (=L) | 2 | 3 | 2 | 4 | 1 | 2 | 0 |

FIG. 10(B)

ENCODING METHOD OF A COLOR IMAGE AND ITS ENCODING DEVICE AND A DECODING METHOD OF THE COLOR IMAGE AND ITS DECODING DEVICE

BACKGROUND OF THE INVENTION

1. Field of Invention

The present invention relates to a method of encoding a color image to display the color image on a personal computer, a portable terminal, or the like and an encoding device therefor, and a method of decoding the color image and a decoding device therefor.

2. Description of Related Art

Conventionally, when a color image is encoded or decoded, a palette is provided which is formed of a predetermined number of colors. An index is assigned in the palette for each pixel, and the color image is encoded and decoded by encoding and decoding the index.

For example, in a personal computer, game equipment, or the like, an image called a multi-color image is used. The multi-color image is also called a representative color image, a limited color image, or the like. As shown in FIG. 15, these are images for which indexes are assigned to specified colors, that is, colors having specified values of R (red), G (green), and B (blue), and which are expressed by a representative color which is limited to 16 colors, 256 colors, or the like by using the data of the indexes.

In this type of the data of the multi-color image, if each color of R, G, and B is hypothetically expressed by 8 bits (256 groups), a total of 24 bits is needed. However, because the index itself is displayed, for example, by 8 bits, the compression percentage is relatively high. However, the amount of information is still large regardless of the compression. Thus, if the information is processed as-is without any consideration, the required memory capacity becomes large and the communication rate becomes slow so that it is not practical. Therefore, the compression technology is extremely important in the multi-color image as well as in other image data. In particular, the number of colors is limited in the multi-color image so that lossless encoding and decoding, that is, a reversible compression technique is needed.

Recently, the technology of using an entropy encoder and decoder has been focused upon as a method of data compression. One example of the entropy encoding and decoding technology is a technology of arithmetical encoding and decoding. The gist of this technology is disclosed, for example, in Japanese Patent Laid-Open Publication Nos. Sho 62-185413, Sho 63-74324, Sho 63-76525, and the like.

FIGS. 20A and 20B show a conventional multi-color image encoding system 50 and decoding system 60 which uses this type of technology. The encoding system 50 includes a line buffer 51 and an entropy encoder 52. The data of the index to be input, that is, the color pixel data 100A, is input to the line buffer 51 and the entropy encoder 52. The color pixel data 100A is input as sequential pixel data in a horizontal scanning order which is raster-scanned as shown in FIG. 21.

Furthermore, as a method for creating the data of the index, that is, the color pixel data 100A, the method to apply the index in order of the color to be input is common. As shown in FIG. 19, phenomena occur such that the colors are significantly different even if the numbers of the index are close (e.g., "1"and "2") and the colors are close even if the numbers of the index are distant (e.g., "100" and "200"). In order to avoid these phenomena, as shown in Japanese Patent Laid-Open Publication No. Hei 5-328142, there is also a method to apply a sequential number to the approximate color.

The line buffer in the encoding system 50, which functions as a reference pixel formation means, forms the reference pixel data A, B, C, and D for an encoding object pixel X, i.e., that is to be encoded, from the color pixel data 100A which was already input. That is, the line buffer 51 stores the history of a portion that includes n lines (approximately 1–5 lines are commonly used) when scanning the image. Furthermore, every time the color pixel data 100A of the encoding object pixel X is input, a series of pixel data which is formed by the previous pixel A and the surrounding pixels B, C, and D is output to the entropy decoder 52 as reference pixel data 110.

The entropy encoder 52 is formed by using methods such as an arithmetical encoding and Huffmnan encoding. Furthermore, the reference pixel data 110 is used as a state signal and the object color pixel data 100A is converted and output to the encoding data 200.

Meanwhile, the decoding system 60 is structured so as to include a line buffer 61 and an entropy decoder 62. At this point, the line buffer 61 and the entropy decoder 62 are formed so as to decode and output the encoded data 200 to be input in the completely reverse order of the line buffer 51 and the entropy encoder 52 of the encoding system 50.

Thus, the encoding system 50 and the decoding system 60 use algorithms which are completely opposite to each other and encode the color pixel data 100A to the encoded data 200. Furthermore, it is possible to output the encoded data 200 by decoding the encoded data 200 to the color pixel data 100B. Therefore, the system can be widely used for various uses.

Here, one example of an arithmetical encoding type of the entropy encoder 52 which is used in the system of FIG. 20A is shown in FIG. 22. Moreover, the structure of the entropy decoder 62 of the arithmetical encoding type is substantially the same as the structure of the entropy encoder 52, so the explanation is omitted here.

The entropy encoder 52 is structured so as to include an arithmetical operation part 55 and a generation probability formation means 56 which functions as a state memory device. In the generation probability formation means 56, in order to determine the symbol generation number probability which is needed for encoding, a state parameter table is written. The above-written state parameter is specified by the state signal to be input. Moreover, for the table of the state parameter, which was specified by the state signal, the generation probability operation parameter of the generation probability formation means 56 is output to the arithmetical operation part 55.

Based upon the generation probability which is thus input, the arithmetical operation part 55 performs entropy encoding, and the color pixel data 100A to be input is converted and output as the encoded data 200. Moreover, the generation probability is re-calculated for the state signal by the value of the encoded color pixel data 100A and is input to the generation probability formation means 56 as an operation parameter update value. The update result is stored in the table as the generation probability of the following data so that the compression efficiency of the entropy encoder 52 improves.

Unlike this type of encoding of a multi-color image, a natural image is fetch-encoded by a scanning device and changed to a multi-color image. In a case like this, in order to efficiently encode the color image, various methods and devices are suggested. For example, in Japanese Patent Laid-Open Publication No. Hei 6-178122, the read image is identified in block units as to whether it is a binary area or a multi-value area, and the respective encoded data of binary image, multi-value image (=natural image), and area information is formed.

Furthermore, in Japanese Patent Laid-Open Publication No. Hei 8-9163, the input color image data is divided into blocks of 16×16 pixels, and it is checked whether each block is a color area or a black-and-white area. With respect to a block of a color area, after sampling is performed in a predetermined sub-sampling ratio, DCT conversion, linear quantization, and entropy encoding are performed. Meanwhile, with respect to a block of a black-and-white area, only the Y component of the color components YCrCb which form the color image data is performed by DCT conversion, linear quantization, and entropy encoding.

Moreover, as a method of compression of two-dimensional image data, using the data information of the previous line is also known (see Japanese Patent Laid-Open Publication No. Hei 7-336696). This technology is to output the data of the length and the position of a partial data row on a previous line as data of that partial data row when data of a previous line and the same partial data row which is one pixel exist.

However, in the conventional multi-color image and natural image general encoding and decoding devices, various types of compression technologies are used and the encoded and decoded data amount is significantly reduced, but no solution to this problem has been developed in terms of the data capacity for the palette. That is, in the conventional color image encoding and decoding devices, when the number of colors to be used is increased, the data capacity for the image increases and the refresh rate for the image display tends to be slow. For example, when a color image of 256×256 pixels is encoded or decoded by 256 colors, a memory of 66,304 bytes is needed. That is, when each color needs a total of three bytes in RGB, 256×3 bytes +256× 256×1 byte (256 colors)=66,304 bytes is established. Thus, in the case of a screen with the 256×256 pixels, even if 256 colors are used, it requires a large capacity of approximately 70 Kbytes and becomes a relatively large amount of data even by using various kinds of complicated compression means. Because of this, when the refresh rate becomes slow, the memory for the display becomes large.

Furthermore, in the prior art as disclosed in Japanese Patent Laid-Open Publication Nos. Hei 6-178122 and Hei 8-9163, because the color image is divided into blocks, since it is divided into black-and-white areas and color areas, and encoded according to these areas, the encoding efficiency improves, but the encoding efficiency does not improve when most of the areas are color areas. In addition, the number of colors to be maintained in order to display the image is the same as the conventional method and a large data capacity of data is required. Moreover, in the compression technology disclosed in Japanese Patent Laid-Open Publication No. Hei 7-336696, the compression efficiency improves when the same pattern continues in the upper and lower directions, but the compression rate does not improve at all when pixels which are different for each line continue in the vertical direction.

SUMMARY OF THE INVENTION

An object of the present invention is to provide a color image encoding method which can improve the refresh rate and minimize the memory for display, and an encoding device, and a color image decoding method and a decoding device for when the color image is reproduced. Furthermore, another object of the present invention is to provide a color image encoding method and an encoding device that improves the compression rate and the decoding efficiency of the image and the encoding device, and also to provide a corresponding color image decoding method and decoding device.

In order to achieve the above objects, in the present invention, a color image encoding method which inputs and encodes color image data includes the steps of counting the number of colors used in the input color image data, creating a global pallet in which indexes corresponding to respective colors are listed when the number of colors used is a predetermined value or less, dividing the input color image data into a plurality of blocks, creating a local palette in which the indexes in the global palette are listed when the number of colors in a block is less than the number of colors in the global palette, assigning the indexes in the global palette to the input pixels when the number of colors in the block is the same as the number of colors in the global palette and which otherwise assigns the indexes in the local palette to the input pixels, and encoding the color indexes, wherein, when the predetermined value is $2^n$ (n is $2^x$ when x is an integer equal to or greater than 0), the indexes in the global palette are expressed by n bits, and when the number of colors in the block is $2^m$ (m is $2^x$ where x is an integer equal to or greater than 0, however, m is an integer equal to or greater than a specified value when m is equal to or greater than said specified value), the index in the local palette is expressed by m bits, and wherein the local palette is not created when n=m, and the local palette is created when n>m.

Because of this, when the color image encoding method is used, the data which becomes the object of encoding is significantly reduced and it is possible to minimize the data capacity. Because of this, it is possible to use a simple compression method and improve the refresh rate. Moreover, prior to the image display, it is possible to perform decoding of only the block which is needed for display, and to minimize the memory for display. Furthermore, it is possible to display the number of colors in the global palette and local palette with numbers of bits such as 1, 2, 4, 8, 16, and 32, respectively, and to improve the processing efficiency when the encoding process is performed in a CPU. Moreover, when m is the specified value or more, it is possible to control the capacity of the data which indicates the indexes because the value of m increases by one bit unit.

Moreover, in the present invention, in the color image encoding method, the predetermined value is set at 256 colors, the specified value is set at 5, and the size of one block is set at 32×32 pixels.

When the block size is set at 32×32 pixels, the maximum becomes 1,024 colors, and most images are accommodated within 256 colors. Thus, by setting the predetermined value at 256 colors, the present invention applies to most images and it is possible to reduce the memory and improve the refresh rate. Furthermore, when the number of colors in the block exceeds 16 colors and stays less than 32 colors, it can be expressed by five bits, when the number of colors exceeds 32 colors and stays less than 64 colors, it can be expressed by six bits, when the number of colors exceeds 64 colors and stays less than 128 colors, it can be expressed by 7 bits. It is possible to control the data capacity required for the color indexes to a small size. In particular, data such as a map has approximately 20 colors in many cases, so in the case of data like that, it can be expressed by five bits, and it is possible to definitely minimize the capacity compared to eight bits when m is the x square of 2. In addition, when run length encoding is performed, 16 can be used as a maximum number of runs and it can be processed by four bits at that time.

Furthermore, in the present invention, a color image encoding device which inputs and encodes the color image data comprises a global palette creation means which counts the number of colors used in the input color image data and creates a global palette in which indexes corresponding to respective colors are listed when the number of colors used is a predetermined value or less, a block division means which divides the input color image data into a plurality of blocks, a local palette creation means which creates a local palette in which the indexes in the global palette are listed when the number of colors in a block is less than the number of colors in the global palette, a color index assigning means which assigns the indexes in the global palette to the input pixels when the number of colors in the block is the same as the number of colors in the global palette and which otherwise assigns the indexes in the local palette to the input pixels, and an encoding process which encodes the color indexes, wherein, when the predetermined value is $2^n$ (n is $2^x$ when x is an integer equal to or greater than 0), the indexes in the global palette are expressed by n bits, and when the number of colors in the block is $2^m$ (m is $2^x$ where x is an integer equal to or greater than 0, however, m is an integer equal to or greater than a specified value when m is equal to or greater than said specified value), the index in the local palette is expressed by m bits, and wherein the local palette is not created when n=m, and the local palette is created when n>m.

Because of this, when the color image encoding device is used, the data which becomes the object of encoding is significantly reduced and it is possible to minimize the data capacity. Because of this, it is possible to use a simple compression method and improve the refresh rate. Moreover, prior to the image display, it is possible to perform decoding of only the block which is needed for display, and to minimize the memory for display. Furthermore, it is possible to display the number of colors in the global palette and local palette with numbers of bits such as 1, 2, 4, 8, 16, and 32, respectively, and to improve the processing efficiency when the encoding process is performed in a CPU. Moreover, when m is the specified value or more, it is possible to control the capacity of the data which indicates the index because the value of m increases by one bit unit.

In addition, in the invention, in the color image encoding device, the predetermined value is set at 256 colors, the specified value is set at 5, and the size of one block is set at 32×32 pixels.

When the block size is set at 32×32 pixels, the maximum becomes 1,024 colors, and most images are accommodated within 256 colors. Thus, by setting the predetermined value at 256 colors, the present invention applies to most images and it is possible to reduce the memory and improve the refresh rate. Furthermore, when the number of colors in the block exceeds 16 colors and stays less than 32 colors, it can be expressed by five bits, when the number of colors exceeds 32 colors and stays less than 64 colors, it can be expressed by six bits, when the number of colors exceeds 64 colors and stays less than 128 colors, it can be expressed by 7 bits. It is possible to control the data capacity required for the color indexes to a small size. In particular, data such as a map has approximately 20 colors in many cases, so in the case of data like that, it can be expressed by five bits, and it is possible to definitely minimize the capacity compared to eight bits when m is the x square of 2. In addition, when run length encoding is performed, 16 can be used as a maximum number of runs and it can be processed by four bits at that time.

Furthermore, in the present invention, a color image decoding method which decodes the encoded color image data includes the steps of identifying the number of colors used in the entire color image data to be decoded, calling the global palette in which indexes corresponding to respective colors are listed when the number of colors used is a predetermined value or less, and decoding data that was encoded by dividing the color image data into a plurality of blocks, wherein the block decoding step has a number of colors in the block identifying step which identifies the number of colors in the divided blocks, and a conditional alias decoding step which, when the number of colors which was identified by the number of colors in the block identifying step is less than the number of colors in the global palette, a column corresponding to the local palette in which the indexes in the global palette are listed is called from the values of the decoded color indexes and the colors of the global palette which is described in the local palette is decoded, and which, when the number of colors which was identified by the number of colors in the block identifying step is the same as the number of colors in the global palette, directly decodes the colors of the global palette from the values of the color indexes which were decoded, and wherein, when the predetermined value is $2^n$ (n is $2^x$ when x is an integer equal to or greater than 0), the indexes in the global palette are expressed by n bits, and when the number of colors in the block is $2^m$ (m is $2^x$ where x is an integer equal to or greater than 0, however, m is an integer equal to or greater than a specified value when m is equal to or greater than said specified value), the index in the local palette is expressed by m bits, and wherein the local palette is not created when n=m, and the local palette is created when n>m.

Because of this, when this color image decoding method, the color data amount at the time of decoding is significantly reduced and it is possible to use a simple decoding method. Because of this, it is possible to improve the refresh rate. Moreover, it is not necessary to decode the entire image, and it is acceptable to reproduce the only the blocks which are needed for display. As a result, it is possible to reduce the memory for display and miniaturize the device which uses this decoding method, and to reduce the cost. Furthermore, it is possible to display the number of colors in the global palette and local palette with numbers of bits such as 1, 2, 4, 8, 16, and 32, respectively, and to improve the processing efficiency when the decoding process is performed in the CPU. Moreover, when m is the specified value or more, it is possible to control the capacity of the data which indicates the indexes because the value of m increases by one bit unit.

Moreover, in the present invention, in the color image decoding method, the predetermined value is set at 256 colors, the specified value is set at 5, and the size of one block is set at 32×32 pixels.

When the block size is thus set at 32×32 pixels, the maximum becomes 1,024 colors, and most images are accommodated within 256 colors. Thus, by setting the predetermined value at 256 colors, the present invention applies to most images and it is possible to reduce the memory required and improve the refresh rate. Furthermore, when the number of colors in the block exceeds 16 colors and stays less than 32 colors, it can be expressed by five bits, when the number of colors exceeds 32 colors and stays less than 64 colors, it can be expressed by six bits, when the number of colors exceeds 64 colors and stays less than 128 colors, it can be expressed by 7 bits. It is possible to control the data capacity required for the color indexes to a small size. In particular, data such as a map has approximately 20 colors in many cases, so in such a case, it can be expressed by five bits, and it is possible to definitely minimize the capacity compared to eight bits when m is the x square of 2. In addition, when run length encoding is performed, 16 can be used as a maximum number of runs and it can be processed by four bits at that time.

Furthermore, in the present invention, a color image decoding device which decodes the encoded color image data comprises a number of colors used identifying means which identifies the number of colors used in the entire color image data to be decoded, a global palette maintaining means which maintains a global palette in which indexes corresponding to respective colors are described when the number of colors used is a predetermined value or less, and a block decoding means which decodes the data encoded by dividing the color image data into a plurality of blocks to each block, wherein the block decoding means has a number of colors in the block identifying means which identifies the number of colors in the divided blocks, a local palette maintaining means which maintains a local palette in which indexes within the global palette are listed, and a conditional alias decoding means which, when the number of colors identified by the number of colors in the block identifying means is less than the number of colors in the global palette, calls the column corresponding to the local palette in which the index in the global palette from the value of the decoded color index are listed and decodes the colors of the global palette that are listed in the local palette, directly decodes the colors in the global palette from the values of the decoded color indexes when the number of colors which were identified by the number of colors in the block identifying means is the same as the number of colors in the global palette, wherein, when the predetermined value is $2^n$ (n is $2^x$ when x is the integer equal to or greater than 0), the indexes in the global palette are expressed by n bits, and when the number of colors in the block is $2^m$ (m is $2^x$ where x is an integer equal to or greater than 0, however, m is an integer equal to or greater than a specified value when m is equal to or greater than said specified value), the index in the local palette is expressed by m bits, and wherein the local palette is not created when n=m, and the local palette is created when n>m.

Because of this, when this color image decoding method is used, the color data amount which is used for decoding is significantly reduced and it is possible to use a simple decoding method. Because of this, it is possible to improve the refresh rate. Moreover, it is not necessary to decode the entire image, and it is acceptable to reproduce only the blocks which are needed for display. As the result, it is possible to minimize the memory for display, miniaturize it, and reduce the cost. Furthermore, it is possible to display the number of colors in the global palette and local palette with numbers of bits such as 1, 2, 4, 8, 16, and 32, respectively, and to improve the processing efficiency when the decoding process is performed in the CPU. Moreover, when m is the specified value or more, it is possible to control the capacity of the data which indicates the indexes because the value of m increases by one bit unit.

Moreover, in the present invention, in the color image decoding method, the predetermined value is set at 256 colors, the specified value is set at 5, and the size of one block is set at 32×32 pixels.

When the block size is set at 32×32 pixels, the maximum becomes 1,024 colors, and most images are accommodated within 256 colors. Thus, by setting the predetermined value at 256 colors, the present invention applies to most images and it is possible to reduce the memory and improve the refresh rate. Furthermore, when the number of colors in the block exceeds 16 colors and stays less than 32 colors, it can be expressed by five bits, when the number of colors exceeds 32 colors and stays less than 64 colors, it can be expressed by six bits, when the number of colors exceeds 64 colors and stays less than 128 colors, it can be expressed by 7 bits. It is possible to control the data capacity required for the color indexes to a small size. In particular, data such as a map has approximately 20 colors in many cases, so in a case such as that, it can be expressed by five bits, and it is possible to definitely minimize the capacity compared to eight bits when m is the x square of 2. In addition, when run length encoding is performed, 16 can be used as a maximum number of runs and it can be processed by four bits at that time.

Furthermore, in the present invention, a color image encoding method which inputs and encodes the color image data has a block division step which divides the input color image data into a plurality of blocks, a maintaining step which maintains the image data of the blocks, and a modeling method determination step which, when the image state in a block which was pre-scanned is temporarily run-length encoded, and the ratios where the value of the run becomes 1 and 2 are a specified value or less, run-length models, the block models using surrounding reference pixels when the specified value is exceeded.

Because of this, it is possible to use the most appropriate encoding method per block in the image, so the compression rate of the entire image improves and the decoding rate becomes fast in the case of decoding.

Furthermore, in the present invention, a color image encoding method which inputs and encodes the color image data includes the steps of counting the number of colors used in the input color image data, creating a global palette in which indexes corresponding to respective colors are listed when the number of colors used is a predetermined value or less, dividing the input color image data into a plurality of blocks, creating a local palette in which the indexes in the global palette are listed when the number of colors in a block is less than the number of colors in the global palette, assigning the indexes in the global palette to the input pixels when the number of colors in the block is the same as the number of colors in the global palette, encoding the color index, maintaining the image data of the block, and a modeling method determination step which, when the image state in a block which was pre-scanned is temporarily run-length encoded, and the ratios where the value of the run becomes 1 and 2 are a specified value or less, run-length models the block using surrounding reference pixels when the specified value is exceeded.

Because of this, if the color image encoding method is used, the data which becomes the object of encoding is significantly reduced and it is possible to minimize the required data capacity. Because of this, it is possible to use a simple compression method and improve the refresh rate. Moreover, prior to the image display, it is possible to decode only the blocks which are needed for display and to minimize the memory needed for display. Furthermore, because the most appropriate encoding method can be used per block in the image, the compression rate of an entire image can improve and the decoding rate becomes fast in the case of decoding.

Moreover, in the present invention, the color image encoding method takes a value within 15–25% as the specified value.

As a result, when the same pixel does not continue, or even though it continues, if two pixels have the specified value or more determined by a value of 15–25% in the block, the efficiency of the run-length encoding deteriorates so that it is possible to improve the compression rate by using the surrounding reference pixel modeling. Meanwhile, when the value is the specified value or less within 15–25% the run-length encoding shows better efficiency so that it is possible to improve the encoding efficiency by the run-length modeling. Because of this, whatever state the image is in, it is possible to encode the image by using the encoding model which has better efficiency in response to the characteristics of the blocks which divide the image so that the encoding efficiency of the entire image improves.

In addition, in the present invention, in the color image encoding method, in the case of the surrounding reference pixel modeling, it is shown by a fixed-length bit whether the pixel to be encoded is the same as a specific one of the surrounding pixels.

Thus, because the fixed-length is used in order to specify that that pixel is the same as a surrounding pixel, if hardware is used which can perform a bit shift, the encoding and decoding rate improves.

Moreover, in the present invention, a color image encoding method which inputs and encodes the color image data has a block division means which divides the input color image data into a plurality of blocks, a maintaining means which maintains the image data of the blocks, and a modeling method determination means which, when the image state in a block which was pre-scanned is temporarily run-length encoded, and the ratios where the value of the run becomes 1 and 2 are a specified value or less, run-length models, the block models using surrounding reference pixels when the specified value is exceeded.

Because of this, it is possible to use the most appropriate encoding method per block in the image, so the compression rate of the entire image improves and the decoding rate becomes fast in the case of decoding.

Moreover, in the present invention, a color image encoding device which inputs and encodes the color image data comprises a number of colors used counting means which counts the number of colors used in the input color image data, a global palette creation means which creates a global palette in which indexes corresponding to respective colors are listed when the number of colors used is a predetermined value or less, a block division means which divides the input color image data into a plurality of blocks, a local palette creation means which creates a local palette in which the indexes in the global palette are listed when the number of colors in a block is less than the number of colors in the global palette, a color index assigning means which assigns the indexes in the global palette to the input pixels when the number of colors in the block is the same as the number of colors in the global palette, and which otherwise assigns the indexes in the local palette to the input pixel, an encoding means which encodes the color indexes, a maintaining means which maintains the image data of the block, and a modeling method determination means which, when the image state in a block which was pre-scanned is temporarily run-length encoded, and the ratios where the value of the run becomes 1 and 2 are a specified value or less, run-length models the block using surrounding reference pixels when the specified value is exceeded.

Because of this, if the color image encoding method is used, the data which becomes the object of encoding is significantly reduced and it is possible to minimize the required data capacity. Because of this, it is possible to use a simple compression method and improve the refresh rate. Moreover, prior to the image display, it is possible to decode only the blocks which are needed for display and to minimize the memory needed for display. Furthermore, because the most appropriate encoding method can be used per block in the image, the compression rate of an entire image can improve and the decoding rate becomes fast in the case of decoding.

Moreover, in the present invention, the color image encoding method takes a value within 15–25% as the specified value.

As the result, when the same pixel does not continue, or even though it continues, if two pixels have the specified value or more determined by a value of 15–25% in the block, the efficiency of the run-length encoding deteriorates so that it is possible to improve the compression rate by using the surrounding reference pixel modeling. Meanwhile, when the value is the specified value or less within 15–25%, the run-length encoding shows better efficiency so that it is possible to improve the encoding efficiency by the run-length modeling. Because of this, whatever state the image is in, it is possible to encode the image by using the encoding model which has better efficiency in response to the characteristics of the blocks which divide the image so that the encoding efficiency of the entire image improves.

In addition, in the present invention, in the color image encoding method, in the case of the surrounding reference pixel modeling, it is shown by a fixed-length bit whether the pixel to be encoded is the same as a specific one of the surrounding pixels.

Thus, because the fixed-length is used, in order to specify that that pixel is the same as a surrounding pixel, if hardware is used which can perform a bit shift, the encoding and decoding rate improves.

Furthermore, in the present invention, a color image decoding method which decodes encoded color image data comprises a block decoding step which divides the color image data into a plurality of blocks and decodes the encoded data per respective block, wherein the block decoding step includes the steps of determining whether the block to be decoded is encoded by run-length modeling or by surrounding reference pixel modeling, and decoding by the run-length modeling or the surrounding reference pixel modeling based upon the determination result of the determination step.

Because of this, the pixels are decoded by the most appropriate decoding method per block in the image, so the decoding efficiency of the entire image improves.

Furthermore, in the present invention, a color image decoding method which decodes the encoded color image data includes the steps of identifying the number of colors used in the entire color image data to be decoded, calling the global palette in which indexes corresponding to respective colors are listed when the number of colors used is a predetermined value or less, and decoding data that was encoded by dividing the color image data into a plurality of blocks, wherein the block decoding step has a number of colors in the block identifying step which identifies the number of colors in the divided blocks, and a conditional alias decoding process which, when the number of colors which was identified by the number of colors in the block identifying step is less than the number of colors in the global palette, a column corresponding to the local palette in which the indexes in the global palette are listed is called from the values of the decoded color indexes and the colors of the global palette which is described in the local palette is decoded, and which, when the number of colors which was identified by the number of colors in the block identifying step is the same as the number of colors in the global palette, directly decodes the colors of the global palette from the values of the color indexes which were decoded, a determination step which determines whether the block to be decoded is encoded by the run-length modeling or the surrounding reference pixel modeling, and a decoding step which decodes by the run-length modeling or the surrounding reference pixel modeling based upon the determination result of the determination process.

Because of this, when this color image decoding method is used, it is possible to significantly reduce the color data amount which is used for decoding and to use a simple decoding method. Because of this, it is possible to improve the refresh rate. Furthermore, it is not necessary to decode the entire image, and it is acceptable to reproduce only the blocks which are needed for the display. As a result, it is possible to reduce the memory required for display, miniaturize the device which uses the decoding method, and reduce the cost. Moreover, because the pixels are decoded by the most appropriate decoding method per block in the image, the decoding efficiency of the entire image improves.

In addition, in the present invention, in the color image decoding method, in the case of decoding by the surrounding reference pixel modeling, it is shown by a fixed-length bit whether the pixel to be decoded is the same as a specific one of the surrounding pixels.

Thus, because the fixed-length is used in order to specify that that pixel is the same as the surrounding pixel, when hardware is used which can perform a bit shift, the rate improves in the case of decoding.

Furthermore, in the present invention, a color image decoding method which decodes encoded color image data includes the steps of dividing the color image data into a plurality of blocks and decoding the encoded data per respective block, wherein the block decoding means comprises a determination means which determines whether the block to be decoded is encoded by run-length modeling or by surrounding reference pixel modeling and a decoding means which decodes by the run-length modeling or the surrounding reference pixel modeling based upon the determination result of the determination means.

Because of this, the pixels are decoded by the most appropriate decoding method per block in the image, so the decoding efficiency of the entire image improves.

Furthermore, in the present invention, a color image decoding device which decodes the encoded color image data comprises a number of colors used identifying means which identifies the number of colors used in the entire color image data to be decoded, a global palette calling means which calls the global palette in which indexes corresponding to respective colors are listed when the number of colors used is a predetermined value or less, and a block decoding means which decodes data that was encoded by dividing the color image data into a plurality of blocks, wherein the block decoding means has a number of colors in the block identifying means which identifies the number of colors in the divided blocks, and a conditional alias decoding means which, when the number of colors which was identified by the number of colors in the block identifying means is less than the number of colors in the global palette, a column corresponding to the local palette in which the indexes in the global palette are listed is called from the values of the decoded color indexes and the colors of the global palette which is described in the local palette is decoded, and which, when the number of colors which was identified by the number of colors in the block identifying means is the same as the number of colors in the global palette, directly decodes the colors of the global palette from the values of the color indexes which were decoded, a determination means which determines whether the block to be decoded is encoded by the run-length modeling or the surrounding reference pixel modeling, and a decoding means which decodes by the run-length modeling or the surrounding reference pixel modeling based upon the determination result of the determination means.

Because of this, when this color image decoding device is used, it is possible to significantly reduce the color data amount which is used for decoding and to use a simple decoding means. Because of this, it is possible to improve the refresh rate. Furthermore, it is not necessary to decode the entire image, and it is acceptable to reproduce only the blocks which are needed for the display. As a result, it is possible to reduce the memory for display, miniaturize the device which uses the decoding method, and reduce the cost. Moreover, because the pixels are decoded by the most appropriate decoding means per block in the image, the decoding efficiency of the entire image improves.

In addition, in the present invention, in the color image decoding method, in the case of decoding by the surrounding reference pixel modeling, it is shown by a fixed-length bit whether the pixel to be decoded is the same as a specific one of the surrounding pixels.

Thus, because the fixed-length is used in order to specify that the pixel is the same as the surrounding pixel, when hardware is used which can perform a bit shift, the decoding rate improves.

Furthermore, in the present invention, a color image encoding method which inputs and encodes color image data includes the steps of dividing the input color image data into a plurality of blocks, scanning and maintaining the color image data to be encoded, run-length modeling when a pixel of a specified position is the same color as the previous pixel and is different from a pixel of one line before, copy mode forming which, when the pixel of the specified position is a different color from the previous pixel, forms a copy mode which compares the pixel of the one line before to the pixel of the specified position and copies the pixel of the one line before in the case of the same color, taking the number of continuous pixels for which the color is the same as the pixel of one line before as a number of copies, and encoding the value of the copy mode and the value of the number of copies along with the other color indexes which were run-length modeled and the normal value of the run.

Thus, the pixels are usually encoded by the run-length modeling, and when the run does not continue, the pixel of one line before is compared, and in the case of the same color, so-called copying will be carried out, so it is possible to improve the compression rate even if various images such as vertical and horizontal patterns appear in the image.

Furthermore, in the present invention, a color image encoding method which inputs and encodes the color image data includes the steps of counting the number of colors used in the input color image data, creating a global palette in which indexes corresponding to respective colors are listed when the number of colors used is a predetermined value or less, dividing the input color image data into a plurality of blocks, creating a local palette in which the indexes in the global palette are listed when the number of colors in a block is less than the number of colors in the global palette, assigning the indexes in the local palette to the input pixels when the number of colors in the block is the same as the number of colors in the global palette, and otherwise assigning the indexes in the local palette to the input pixels, and encoding the color indexes, maintaining the color image data to be encoded, run-length modeling when a pixel of a specified position is the same color as the previous pixel and is a different color from a pixel of one line before, copy mode forming which, when the pixel of the specified position is the same color as the previous pixel and the pixel of the next position is a different color from the previous pixel, forms a copy mode which compares the pixel of the one line before the pixel of the specified position and copies the pixel of the one previous line in the case of the same color, taking the number of continuous pixels for which the color is the same as the pixel of the one line before as a number of copies, and encoding the value of the copy mode and the value of the number of copies along with the other color indexes which were run-length modeled and the normal value of the run.

Because of this, this color image encoding method is used, the data which becomes the object of encoding is significantly decreased and it is possible to minimize the required data capacity. Because of this, it is possible to use a simple compression method and to improve the refresh rate. Furthermore, prior to the image display, it is possible to decode only the blocks which are needed for display and to minimize the memory required for display. In addition, the pixels are usually encoded by run-length modeling, and when a run does not continue, a pixel of the one line before is compared, and in the case of the same color, so-called copying will be carried out, so it is possible to improve the compression rate even if various images such as vertical and horizontal patterns appear in the image.

Moreover, in the present invention, in the color image encoding method, the scan is raster-scanned in the horizontal direction and the pixel of one line before is defined as the pixel that is directly above, and a copy mode is shown using one of the color indexes.

Because of this, with respect to an image of vertical patterns, the compression efficiency does not improve in the conventional run-length encoding technology, but the compression rate improves with vertical patterns and also with horizontal patterns in the present invention.

Furthermore, in the present invention, a color image encoding device which inputs and encodes color image data comprises a block division means which divides the input color image data into a plurality of blocks, a maintaining means which scans and maintains the color image data to be encoded, a run-length modeling means which run-length models when a pixel of a specified position is the same color as the previous pixel and is a different color from a pixel of one line before, a copy mode formation means which, when the pixel of the specified position is a different color from the previous pixel, forms a copy mode which compares the pixel of the one line before to the pixel of the specified position and copies the pixel of the one line before in the case of the same color, a number of copies formation means which takes the number of continuous pixels for which the color is the same as the pixel of one line before as a number of copies, and an encoding means which encodes the value of the copy mode and the value of the number of copies along with the other color indexes which were run-length modeled and the normal value of the run.

Thus, the pixels are usually encoded by the run-length modeling, and when the run does not continue, the pixel of one line before is compared, and in the case of the same color, so-called copying will be carried out, so it is possible to improve the compression rate even if various images such as vertical and horizontal patterns appear in the image.

Furthermore, in the present invention, a color image encoding device which inputs and encodes the color image data comprises a number of colors used counting means which counts the number of colors used in the input color image data, a global palette creation means which creates a global palette in which indexes corresponding to respective colors are listed when the number of colors used is a predetermined value or less, a block division means which divides the input color image data into a plurality of blocks, a local palette creation means which creates a local palette in which the indexes in the global palette are listed when the number of colors in a block is less than the number of colors in the global palette, a color index assigning means which otherwise assigns the indexes in the local palette to the input pixels when the number of colors in the block is the same as the number of colors in the global palette, and which otherwise assigns the indexes in the local palette to the input pixels, and an encoding means which encodes the color indexes, a maintaining means which scans and maintains the color image data to be encoded, a run-length modeling means which run-length models when the pixel of a specified position is the same color as the previous pixel and is a different color from a pixel of one line before, a copy mode formation means which, when the pixel of the predetermined position is a different color from the previous pixel, forms a copy mode which compares a pixel of one line before to the pixel of the specified position and copies the pixel of one line before in the case of the same color, a number of copies formation means which takes the number of continuous pixels for which the color is the same as the pixel of one line before as a number of copies, and an encoding means which encodes the value of the copy mode and the value of the number of copies along with the other color indexes which were run-length modeled and the normal value of the run.

Because of this, this color image encoding device is used, the data which becomes the object of encoding is significantly decreased and it is possible to minimize the required data capacity. Because of this, it is possible to use a simple compression method and to improve the refresh rate. Furthermore, prior to the image display, it is possible to decode only the blocks which are needed for display and to minimize the memory required for display. In addition, the pixels are usually encoded by run-length modeling, and when a run does not continue, a pixel of the one line before is compared, and in the case of the same color, so-called copying will be carried out, so it is possible to improve the compression rate even if various images such as vertical and horizontal patterns appear in the image.

Moreover, in the present invention, in the color image encoding method, the scan is raster-scanned in the horizontal direction and the pixel of one line before is defined as the pixel that is directly above, and a copy mode is shown using one of the color indexes.

Because of this, with respect to an image of vertical patterns, the compression efficiency does not improve in the conventional run-length encoding technology, but the compression rate improves with vertical patterns and also with horizontal patterns in the present invention.

Furthermore, in the present invention, a color image decoding method which decodes encoded color image data includes the steps of dividing the color image data into a plurality of blocks and decoding the encoded data in each block, wherein the block decoding step has a run-length decoding step which, when a copy mode is included that indicates copying of the pixel of one line before the pixel which is decoded in data which was run-length encoded, decodes the same color as the pixel of one line before as many times as the copy mode continues.

Thus, the pixels are usually decoded by the run-length modeling, and when the run does not continue, a pixel of one line before is compared, and in the case of the same color, so-called copying will be carried out, so it is possible to improve the decoding efficiency even if various images such as vertical and horizontal patterns appear in the image.

Furthermore, in the present invention, a color image decoding method which decodes the encoded color image data includes the steps of identifying the number of colors used in the entire color image data to be decoded, calling the global palette in which indexes corresponding to respective colors are listed when the number of colors used is a predetermined value or less, decoding data that was encoded by dividing the color image data into a plurality of blocks, wherein the block decoding step has a number of colors in the block identifying step which identifies the number of colors in the divided blocks, and a conditional alias decoding step which, when the number of colors which was identified by the number of colors in the block identifying process is less than the number of colors in the global palette, a column corresponding to the local palette in which the indexes in the global palette are listed is called from the values of the decoded color indexes and the colors of the global palette which is described in the local palette is decoded, and which, when the number of colors which was identified by the number of colors in the block identifying process is the same as the number of colors in the global palette, directly decodes the colors of the global palette from the values of the color indexes which were decoded, and run-length decoding step which, when a copy mode is included that indicates copying of the pixel of one line before the pixel which is decoded in data which was run-length encoded, decodes the same color as the pixel of one line before as many times as the copy mode continues.

Because of this, when this color image decoding method is used, it is possible to significantly reduce the data amount of the color which is used for decoding and to use a simple decoding method. Because of this, it is possible to improve the refresh rate. Furthermore, it is not necessary to decode the entire image, and it is acceptable to reproduce only the blocks which are needed for the display. As the result, it is possible to reduce the memory required for display, miniaturize the device which uses the decoding method, and reduce the cost. Furthermore, the pixels are usually decoded by the run-length modeling, and when a run does not continue, a pixel of one line before is compared, and in the case of the same color, so-called copying will be carried out, so it is possible to improve the decoding efficiency even if various images such as vertical and horizontal patterns appear in the image.

Moreover, in the present invention, in the color image decoding method, the line scan is raster-scanned and the pixel of one line before is defined as the pixel directly above, and a copy mode is shown using one of the color indexes that show the pixels of the image data.

Because of this, with respect to an image of a vertical pattern, the decoding rate does not improve in the conventional run-length decoding technology, but the decoding rate improves with the vertical patterns and with horizontal patterns in the present invention.

Furthermore, in the present invention, a color image decoding device which decodes encoded color image data comprises a block decoding means which divides the color image data into a plurality of blocks and decodes the encoded data in each block, wherein the block decoding means has a run-length decoding means which, when a copy mode is included that indicates copying of the pixel of one line before the pixel which is decoded in data which was run-length encoded, decodes the same color as the pixel of one line before as many times as the copy mode continues.

Thus, the pixels are usually decoded by the run-length modeling, and when the run does not continue, a pixel of one line before is compared, and in the case of the same color, so-called copying will be carried out, so it is possible to improve the decoding efficiency even if various images such as vertical and horizontal patterns appear in the image.

Furthermore, in the present invention, a color image decoding device which decodes the encoded color image data comprises a number of colors used identifying means which identifies the number of colors used in the entire color image data to be decoded, a global palette calling means which calls the global palette in which indexes corresponding to respective colors are listed when the number of colors used is a predetermined value or less, and a block decoding means which decodes data that was encoded by dividing the color image data into a plurality of blocks, wherein the block decoding means has a number of colors in the block identifying means which identifies the number of colors in the divided blocks, and a conditional alias decoding means which, when the number of colors which was identified by the number of colors in the block identifying means is less than the number of colors in the global palette, a column corresponding to the local palette in which the indexes in the global palette are listed is called from the values of the decoded color indexes and the colors of the global palette which is described in the local palette is decoded, and which, when the number of colors which was identified by the number of colors in the block identifying means is the same as the number of colors in the global palette, directly decodes the colors of the global palette from the values of the color indexes which were decoded, and a run-length decoding means which, when a copy mode is included that indicates copying of the pixel of one line before the pixel which is decoded in data which was run-length encoded, decodes the same color as the pixel of one line before as many times as the copy mode continues.

Because of this, when this color image decoding device is used, it is possible to significantly reduce the data amount of the color which is used for decoding and to use a simple decoding method. Because of this, it is possible to improve the refresh rate. Furthermore, it is not necessary to decode the entire image, and it is acceptable to reproduce only the blocks which are needed for the display. As the result, it is possible to reduce the memory required for display, miniaturize the device which uses the decoding method, and reduce the cost. Furthermore, the pixels are usually decoded by the run-length modeling, and when a run does not continue, a pixel of one line before is compared, and in the case of the same color, so-called copying will be carried out, so it is possible to improve the decoding efficiency even if various images such as vertical and horizontal patterns appear in the image.

Moreover, in the present invention, in the color image decoding method, the line scan is raster-scanned and the pixel of one line before is defined as the pixel directly above, and a copy mode is shown using one of the color indexes which show the pixels of the image data.

Because of this, with respect to an image of a vertical pattern, the decoding rate does not improve in the conventional run-length decoding technology, but the decoding rate improves with the vertical patterns and with horizontal patterns in the present invention.

In each invention of the present application, prior to dividing the image and encoding and/or decoding, the way of holding the palette data, encoding, and the like are well designed. With respect to the design of the way of holding the palette data, by focusing on reducing of the numbers of colors of each block when the image is divided into blocks, as compared to the number of colors when the pixels are seen as an entire image, at least two palettes which have a fewer number of colors are provided in response to the level of the number of colors. The two palettes can be appropriately combined and used in response to the number of colors of the blocks, and result in less encoding and decoding data amount, and improvement of the encoding efficiency and decoding rate.

BRIEF DESCRIPTION OF THE DRAWINGS

FIG. 2 is a diagram explaining the global palette of the color image encoding device.

FIG. 3 is a diagram explaining the local palette of the color image encoding device.

FIGS. 4(A) and 4(B) are charts showing the content of the color indexes in the blocks: wherein FIG. 4(A) is a chart where g mode and s mode do not match, and FIG. 4(B) is a chart where g mode and s mode match.

FIGS. 8(A)–8(C) are diagrams explaining the signals which are obtained by the step of the surrounding reference pixel modeling in FIG. 7: wherein FIG. 8(A) shows the state of the surrounding reference pixels, FIG. 8(B) shows the signal bits of the code data which can be obtained by this step, and FIG. 8(C) shows the arrangement of the code data.

FIGS. 9(A) and 9(B) are diagrams explaining the signals which are obtained by the step of run-length modeling: wherein FIG. 9(A) is a diagram showing the compared pixel, and FIG. 9(B) is a chart showing the value of the code data obtained by the step, and the meaning thereof.

FIGS. 10(A) and 10(B) are diagrams explaining specific examples of the signals which can be obtained by the step of run-length modeling: wherein FIG. 10(A) shows the state of pixels which have been input, and FIG. 10(B) shows the signals to be obtained.

FIGS. 12(A)–12(D) are diagrams showing the content of the code data which is formed by the color image encoding device of FIG. 1: wherein FIG. 12(A) is when s mode is "1", FIG. 12(B) is when s mode is "2", FIG. 12(C) is when s mode is "4", and FIG. 12(D) is when s mode is "8".

FIGS. 14(A) and 14(B) are diagrams showing the processing method when processing a specific image by the color image encoding device of FIG. 1: wherein FIG. 14(A) shows the entire image, and FIG. 14(B) shows a diagram showing one block which was divided.

FIGS. 20(A) and 20(B) are diagrams showing conventional encoding and decoding: wherein FIG. 20(A) is a diagram showing a conventional multi-color image encoding system, and FIG. 20(B) is a diagram showing a conventional multi-color image decoding system.

DETAILED DESCRIPTION OF PREFERRED EMBODIMENTS

Hereafter, an example of an embodiment of the present invention is explained based on FIGS. 1–18. The encoding device and its encoding method is explained initially.

Figure 1:
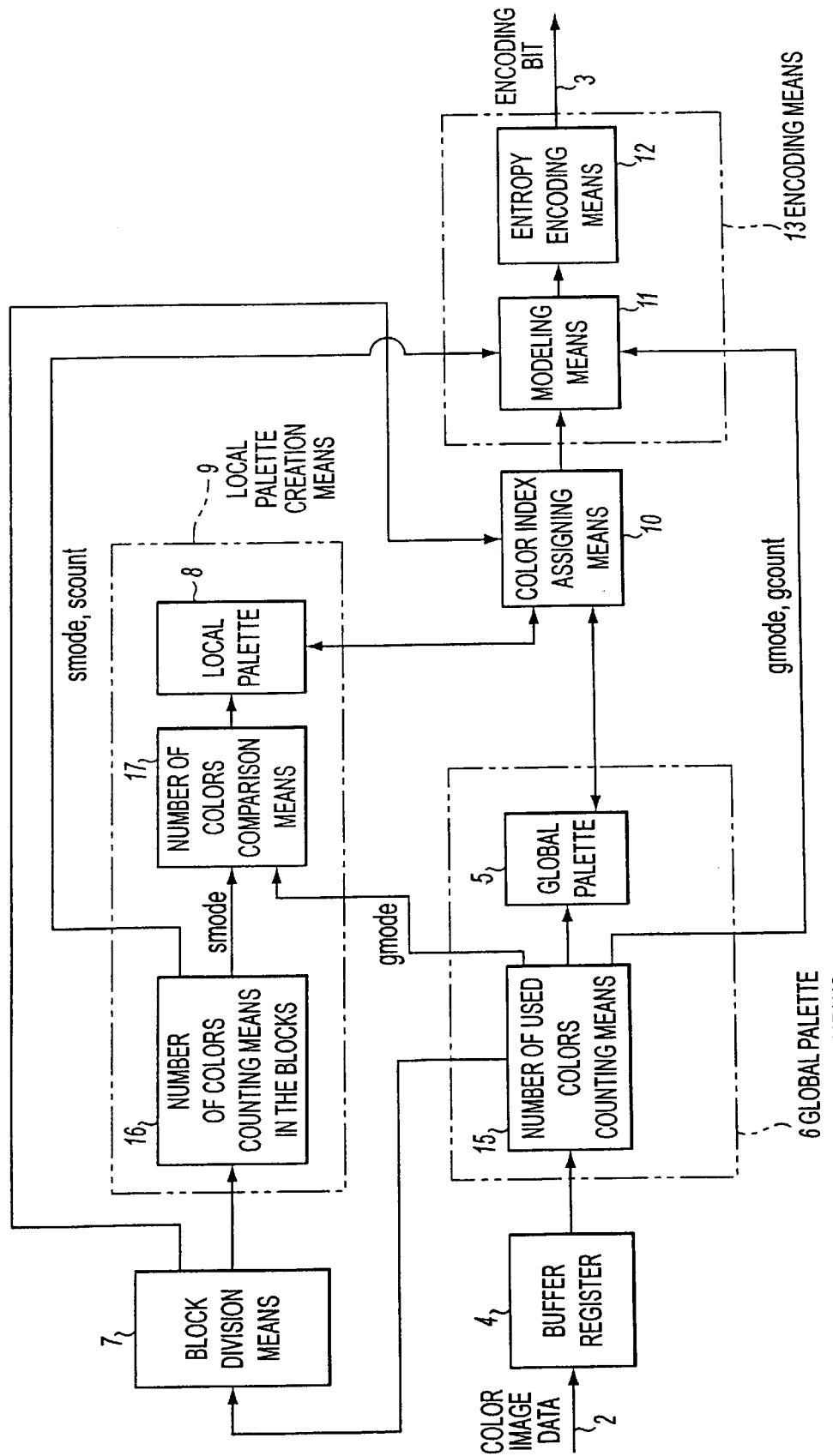
FIG. 1 is a function block diagram of the color image encoding device of an embodiment of the present invention.
Figure 22:
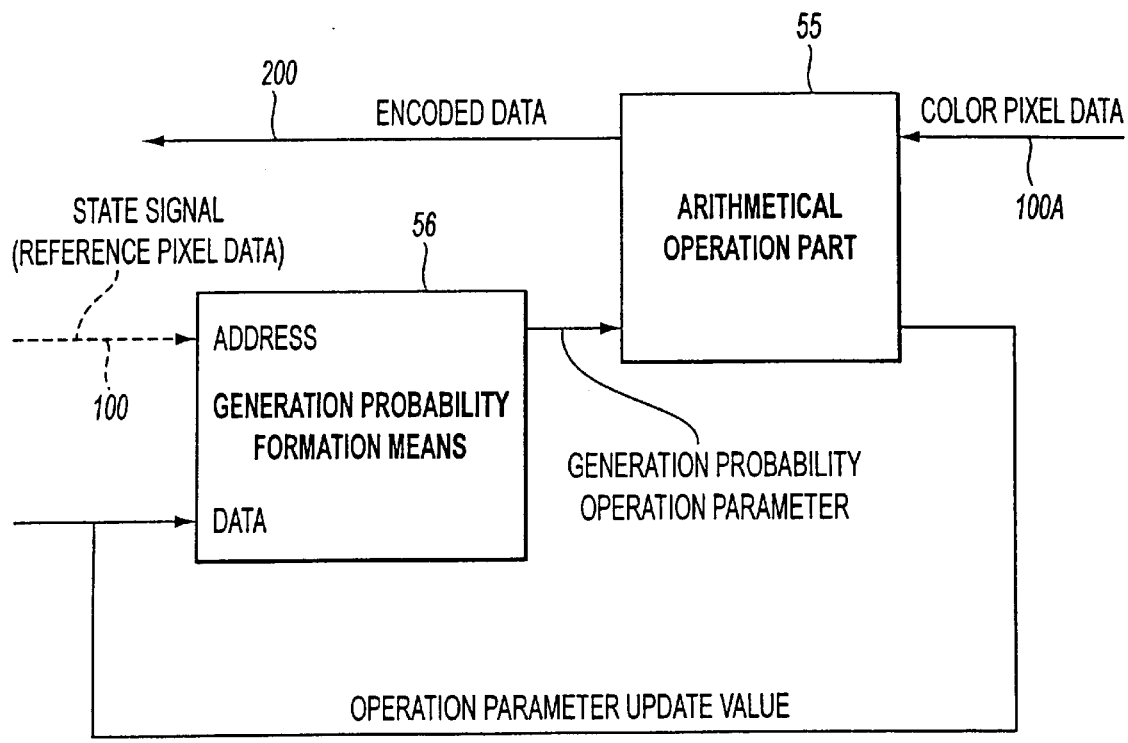
FIG. 22 is a diagram showing the structure of an arithmetical encoding type entropy encoder which is used in a conventional device and the present invention.

The color image encoding device 1 of this embodiment encodes multi-color color image data to an encoding bit 3 which becomes the encoding data. This color image encoding device 1, as shown in FIG. 1, has a buffer register 4 which becomes a maintaining means which temporarily stores all color image data 2, a global palette creation means 6 for counting the number of colors used in the color image data 2 which is input and for creating a global palette 5 that has the index which corresponds to each color when the number of colors used is a predetermined value or less, a block division means 7 which divides the input color image data 2 into a plurality of blocks, a local palette creation means 9 which creates a local palette 8 in which the indexes in the global palette 5 are listed when the number of colors in a block is less than the number of colors in the global palette 5, a color index assigning means 10 which assigns the indexes in the global palette 5 to the input pixels when the number of colors in the block is the same as the number of colors in the global palette 5 and which otherwise assigns the indexes in the local palette 8 to the input pixels, a modeling means 11 which encodes the color indexes, and an entropy encoding means 12, as shown in FIG. 22.

The global palette creation means 6 has a number of used colors counting means 15 which counts the number of used colors in the color image data 2, in other words, the number of used colors in the color image data 2 which is stored in the buffer register 4. Moreover, the local palette creation means 9 has a number of colors within the blocks counting means 16 which counts the number of colors in the blocks and the number of colors comparison means 17 which compares the number of colors in the blocks with a specified value which is the standard when creating the number of colors in the blocks and the global palette 5. Moreover, it includes modeling means 11, entropy encoding means 12 and encoding means 13.

In the present embodiment, 256 colors is adopted as the specified value. In other words, when the entire image which is stored in the buffer register 4 is 256 colors or less, the global palette is written out. The global palette 5, as shown in FIG. 2, aligns specified colors in order, for which the values of RGB are specified. Therefore, they are numbered in order from the top of the global palette. When the value of the number of used colors (hereafter, g count) is 2 colors or less, the number of used colors counting means 15 outputs "1" as the used color number mode (hereafter g mode) with the g count. Similarly, it outputs g mode=2 when the g count is 4 or less, g mode=4 when the g count is 16 or less and g mode=8 when the g count is 256 or less.

Moreover, when the g count exceeds 256, the number of colors used for a block unit is counted without using the global palette 5, and if it is 256 colors or less, it becomes the palette index. However, it is also acceptable to not perform any processing or to thin out the number of colors in the entire image at once and perform the above-mentioned processing (the block unit processing or the method of performing no processing).

Moreover, in the present embodiment, the block dividing means 7 forms and processes blocks with a unit of 32×32 pixels. The number of colors counting means 16 counts the number of colors in the blocks. When the entire image is 256 colors or less and the global palette 5 is written-out, the following processing is performed. Namely, the value of the number of colors in the block (hereafter, s count) and the number of used colors mode (hereafter s mode) are output.

Specifically, the number of colors counting means 16 outputs s mode=1 when s count≦2, s mode=2 when s count≦4, s mode=4 when s count≦16, s mode=5 when s count≦32, s mode=6 when s count≦64, s mode=7 when s count≦128, and s mode=8 when s count≦256. Moreover, when s mode=8 follows after s mode=4, it is suitable to hardware with an 8 bit shift. However, unused bits occur when s mode is 5, 6 and 7, which is a disadvantage in terms of memory capacity. Moreover, when s mode=5,6,7 is adopted, it becomes advantageous in terms of the memory capacity and since all the aforementioned blocks become a specified bit number, there are no specific disadvantages with the bit processing.

Then, when s mode ≠ g mode, the local palette 8 which is a palette index which shows the position number in the global palette 5 is written out. In this local palette 8, as shown in FIG. 3, the numbers of the global palette 5 are aligned in order, and are numbered in order from the top of this local palette 8. Because of this, the color index of the pixels C1, C2, . . . when s mode W g mode, as shown in FIG. 4 (A), shows the number of the local palette 8. This local palette 8 indirectly indicates the global palette 8. The necessary bit number for one color equals the value of the s mode.

On the other hand, when s mode=g mode, the local palette 8 is not created. The color index C1, C2 . . . , as shown in FIG. 4 (B), directly indicates the number of the global palette 5. Moreover, the necessary bit number which is necessary for one color equals the value of the g mode.

Figure 5:
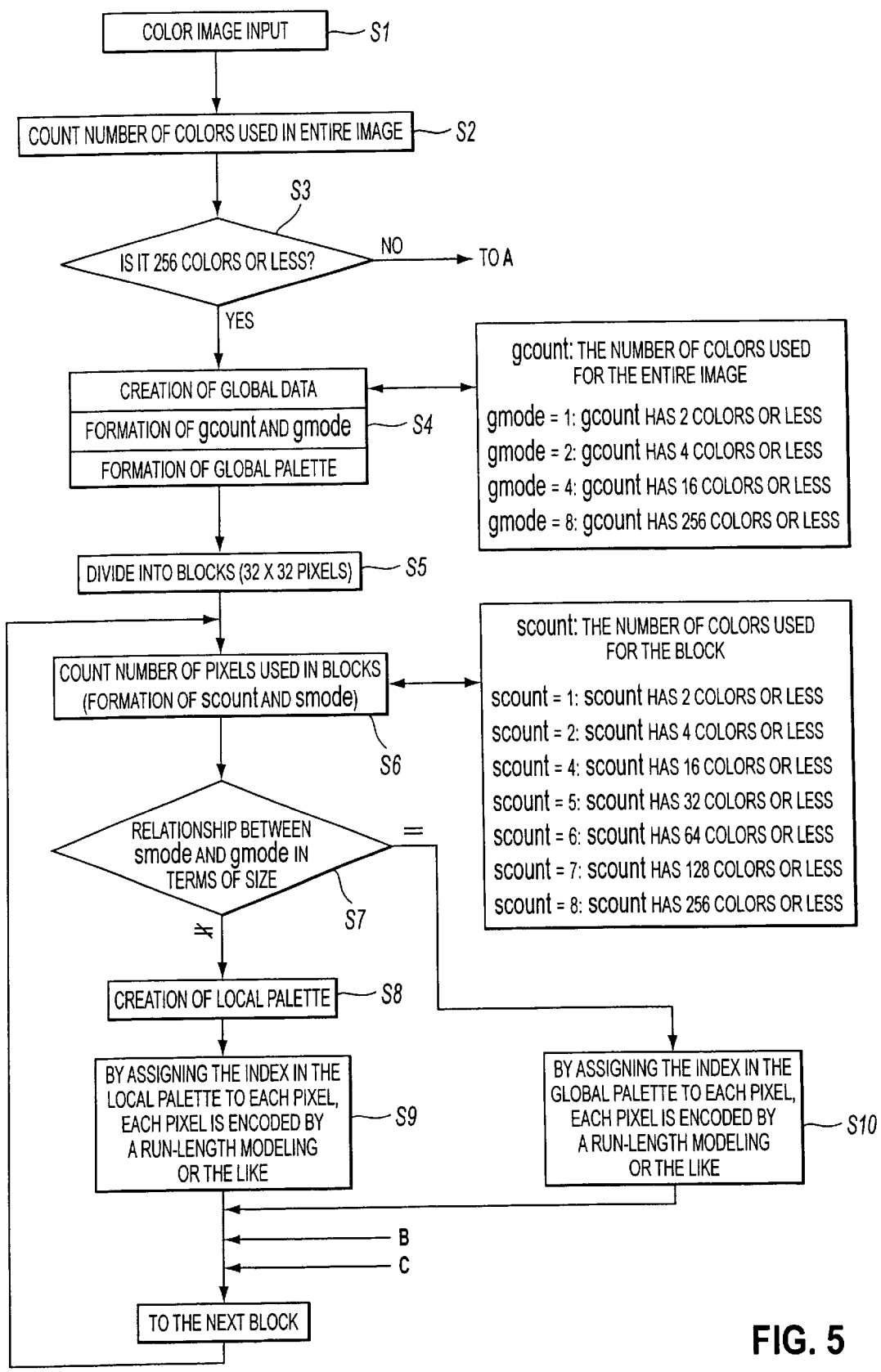
FIG. 5 is a diagram showing the basic routine part of the flow chart showing the processing means of encoding using the color image encoding device of FIG. 1.
Figure 6:
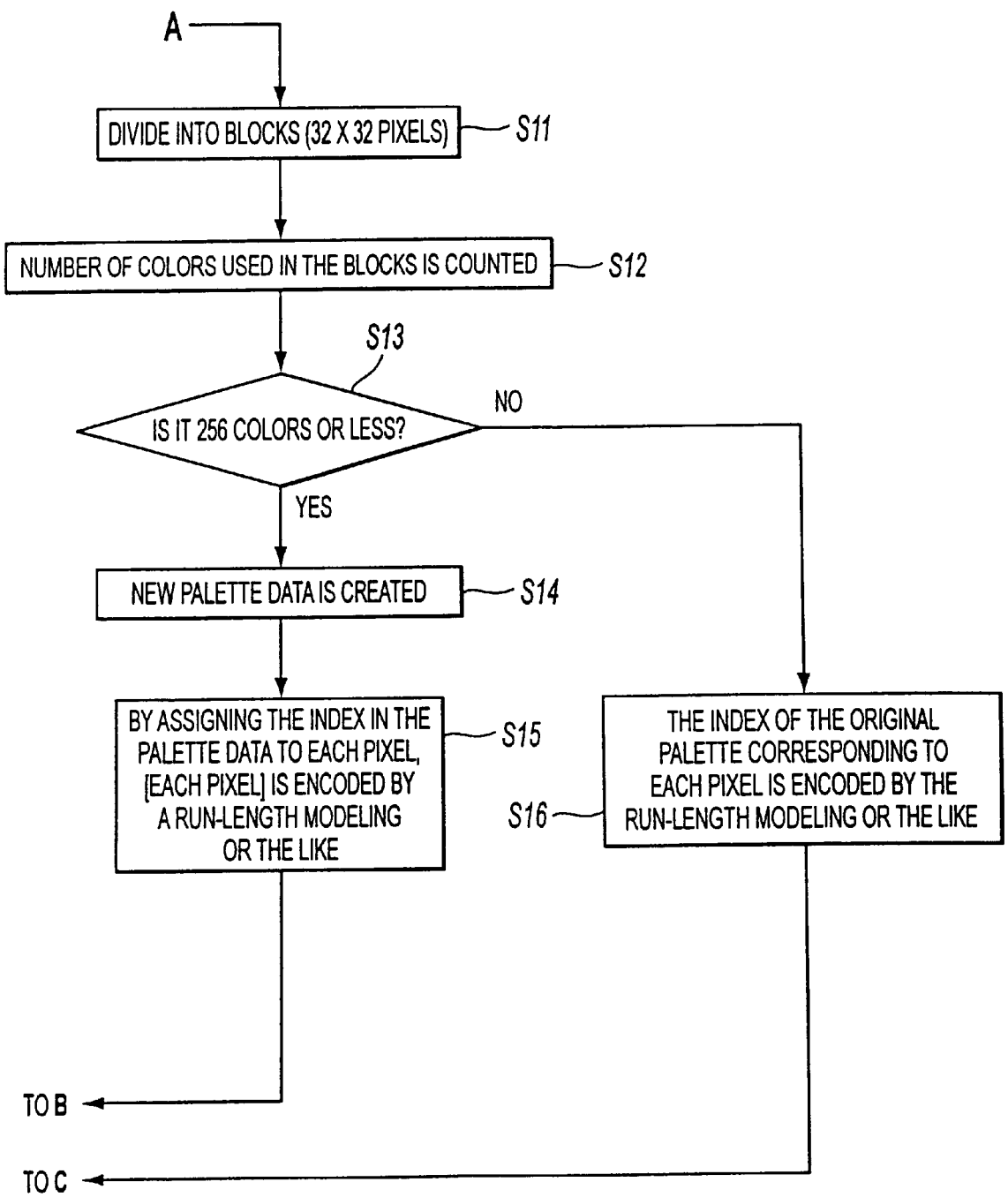
FIG. 6 is a diagram showing a branch part of the flow chart showing the processing means of encoding using the color image encoding device of FIG. 1.

Next, the processing steps of specific encoding by this color image encoding device 1 is explained using FIGS. 1, 5 and 6.

When the color image data 2 is input in the buffer register 4 (step S1), the number of colors used counting means 15 counts the number of colors used in the entire image (step S2). Then, it evaluates whether the value is the specified value, in this case, whether it is 256 colors or less (step S3). When it is 256 colors or less, at step S4, the global data is created. The global data includes the g mode, the g count and the global palette 5.

When the number of colors used in the entire image is 256 colors or less, it divides the image into blocks of 32×32 pixels by the block dividing means 7 (step S5) and processes the blocks. Next, the number of colors used in the first block is counted by the number of colors used in blocks counting means 16 (step S6). In this step S6, the s count and s mode are formed. The formed s mode and the previous g mode are compared by the number of colors comparison means 17 (step S7).

When the s mode and g mode are different, in other words, when s mode<g mode, the local palette 8 is created (step S8). Then, the index in the local palette 8 is given to each pixel in the color index giving means 10, and is made to be a run length model or a surrounding pixel model by the modeling means 11 as later mentioned, and after this, is encoded by the entropy encoding means 12 (step S9). By doing this, the encoding of the block is completed, and control returns to the step S6 for the processing of the next block. At step S7, when the s mode and the g mode are matched, the encoding is performed after giving the index in the global palette 5 to each pixel and similarly performing run length modeling or the like (step S10).

At step S3, when the number of colors used in the entire image exceeds 256 colors, the processing step is performed as shown in FIG. 6, and its content is explained below.

In this case, the global palette 5 is not created, and the color image data 2 in the buffer register 4 is directly divided into blocks of 32×32 pixels by the block dividing means 7 (step S11). Then, the number of colors used in the block is counted by the number of colors in blocks counting means 16 (step S12). The count value evaluates whether it is 256 colors or less (step S13), and when it is 256 colors or less, the palette data corresponding to the global palette 5 which was shown previously is formed in the place corresponding to the local palette 8 (step S14). After this, the index in the palette is assigned by the color index assigning means 10 to each pixel, and it is run length modeled or the like by the modeling means 11. After this, it is encoded by the entropy encoding means 12 (step S15). At step S13, when it exceeds 256 colors, new palette data is not created, and after the index of the original palette of the original pixel which corresponds to each pixel is run length modeled, it is encoded (step S16).

Figure 7:
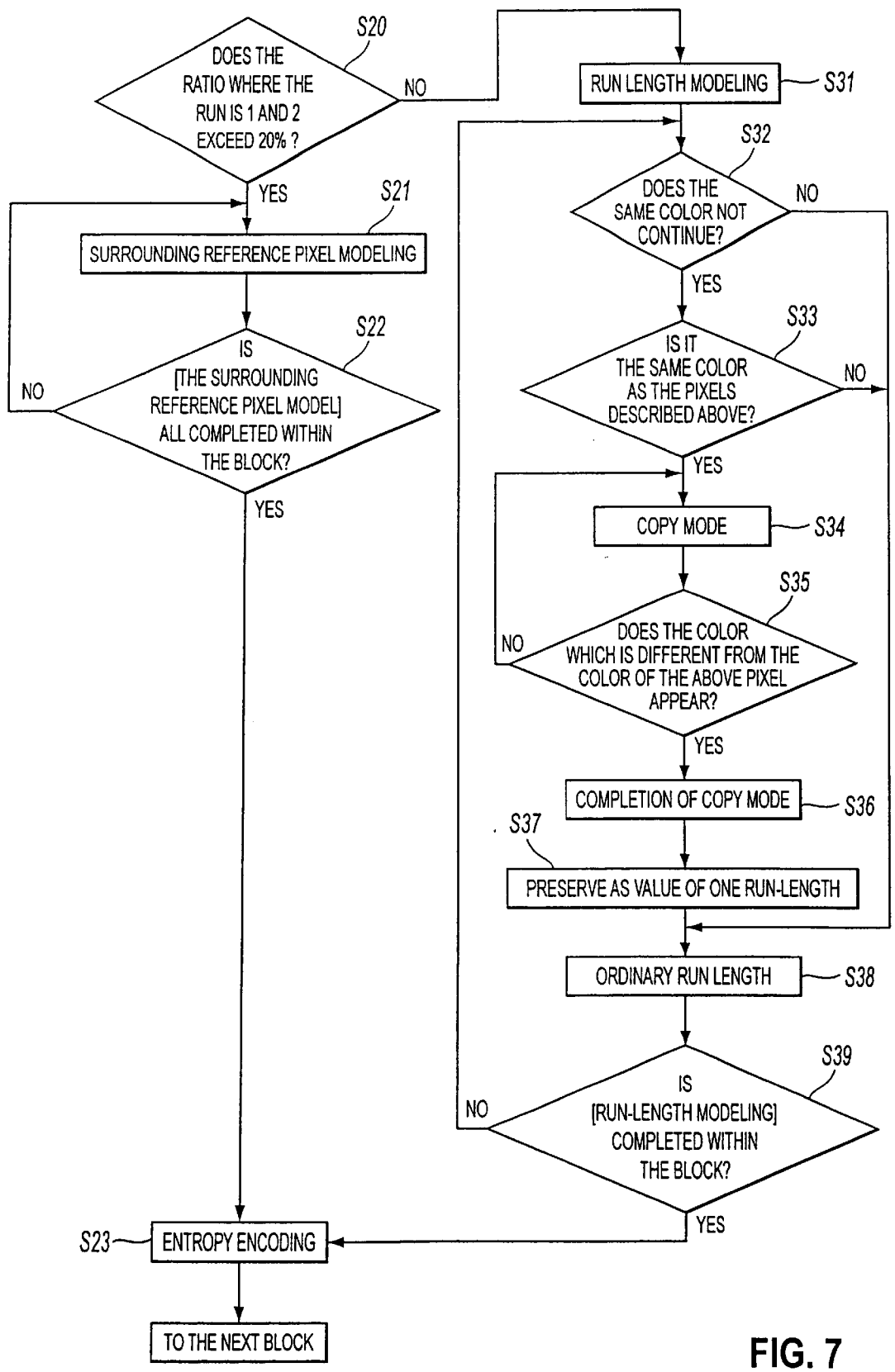
FIG. 7 is a flow chart showing the detailed flow from the modeling to the entropy encoding in FIGS. 5 and 6.

The processes of encoding that are performed at steps S9, S10, S15 and S16 are illustrated in the flow chart of FIG. 7. Specifically, when it is temporarily run length encoded, it is evaluated whether the ratio where the value of run value becomes 1 and 2 exceeds a specified value in the block, which is 20% in the present embodiment by a modeling method evaluation means (not shown) (step S20). Moreover, if the specified value is 15~25%, it is preferable since the efficiency of the run length encoding becomes good when at or under these values.

When the evaluation of step S20 is affirmative, the surrounding reference pixel modeling is performed (step S21). In this step S21, as shown in FIG. 8 (A), the same as the Markov model, the surrounding reference pixels A, B, C and D and the encoding object pixel X are compared. Then, when the encoding object pixel X and the reference pixel A (=one ahead pixel) are matched, the value of L1 data is "0". When it is matched with the reference pixel B (=one above pixel), the value of L1 data is "1", and the value of the L2 data is "00". When it is matched with the reference pixel C, L1="1", and L2="01", and when it is matched with the reference pixel D, L1="1", and L2="10". When it does not match with the reference pixels A, B, C or D, L1="1", and L2="11".

When the signals which are output by this surrounding reference pixel modeling are summarized, it becomes as shown in FIG. 8 (B). By doing this, the signal which is output by this modeling becomes a fixed-length bit in the block. Because of this, the speed of the decoding can be increased.

Moreover, the data structure of the data structure of the code data which is the signal which is output by the surrounding reference pixel modeling, as shown in FIG. 8(C), is divided into the L1 data, L2 data and the color index (C). A strategy such as setting around the borders is employed so that such dividing part of the data is understood.

Whether specified bits are given to all the pixels in the block is evaluated after surrounding reference pixel modeling (step S22). Control returns to step S21 when it is negative, and performs the entropy encoding (step S23) when it is positive. Then, the following processing is performed. Moreover, performing the block completing evaluation of the step S22 may come after the step S23 of entropy encoding.

If the result of step S20 is negative, control moves to the run length modeling step S31.

In the run length modeling step, first of all, it is evaluated whether the same color does not continue (step S32). When it appears that it does not continue, it is determined whether the encoding object pixel is the same color as one line before, in the present embodiment, the pixel directly above (step S33). It moves on to the copy mode (step S34) when it is the same color. Then, the copy mode is continued as long as the encoding object pixel X is the same as the pixel directly above (step S35). The copy mode is completed when a color appears that is different from the pixel directly above (step S36).

Figures 9A, 9B:
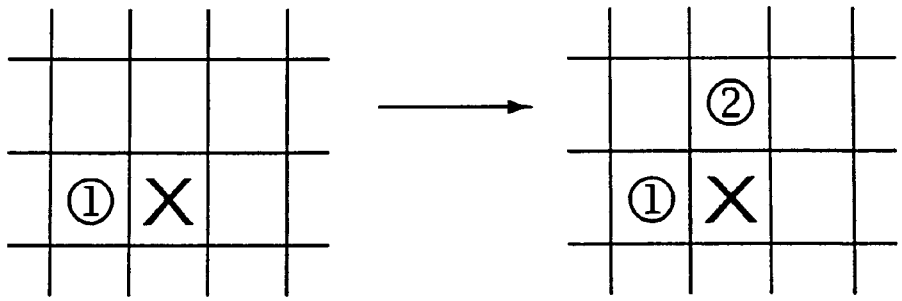

For example, as shown in FIG. 9(A), normally, the pixel ① which is right in front of the encoding object pixel X is compared, but the pixel ② which is directly above is compared when the pixel ③ and the encoding object pixel X are different. Then, for the normal code data, as shown in FIG. 9 (B), when it is the copy mode, C="0" and L≠"0", where the portion of the color index C is other than "0" and the portion of the run L is other than "0". Moreover, it is expressed as C="0" and L="0" when a certain pixel and everything following are all empty. Accordingly, the value of C="0" is positioned as a special mode (=copy mode) in the present embodiment, and also L="0" is used with a special meaning of all the lines being empty.

After the copy mode is completed, the values of C and L from the copy mode are saved as one value of the run length (step S37). Then, it returns to the normal run length (step S38), then returns to step 32 and repeats the following steps as long as all the pixels in the block are not completed (step S39). When the run length is completed for all the pixels in the block, they are entropy encoded (step S23). Moreover, in this flow, the block completion evaluation of step S39 may come after the entropy encoding.

The above-mentioned flow is shown based on the concrete example of FIG. 10. The color index C and the run L become the values as shown in FIG. 10 (B) when there are pixels which have the color indexes which are shown in FIG. 10 (A). L is "2" since two "1"s of the color index C continue, and next L=3 since there are three C=5. Next, L=2 since two C=4 continue. At this time, when C is changed from "1" to "5", and when C is changed from "5" to "4", the normal run length is performed since it becomes Yes at step S32 even though it is different from the pixel directly above in step S33.

Next, when the color index C is changed from "4" to "X", it moves to the steps S32, S33, S34 since it is same as the pixel directly above, and it becomes the copy mode. Because of this, C becomes "0". After this, the copy mode is continued since each of three pixels are same as the pixel directly above, respectively, and the copy mode is completed when different pixels (="3" and "Δ") appear. Then, "4" is saved as the value corresponding to the run. After this, L="0" is assigned with C="0" since one color index C is "3", two color indexes C="4" and an empty space comes at the end.

By switching between the surrounding reference pixel modeling and the run length modeling as described above, the compression ratio is approximately 10% better than when switching is not performed. Moreover, the method in which the so-called copy mode is adopted has a higher compression ratio than the one which does not adopt the copy mode. Moreover, when the copy mode is adopted, the compression ratio becomes higher with a method with vertical patterns in addition to the horizontal patterns of the conventional method. Moreover, when scanning is performed in the vertical direction, the compression ratio of the horizontal patterns becomes higher along with the vertical stripes because of the adoption of the copy mode.

Figure 11:
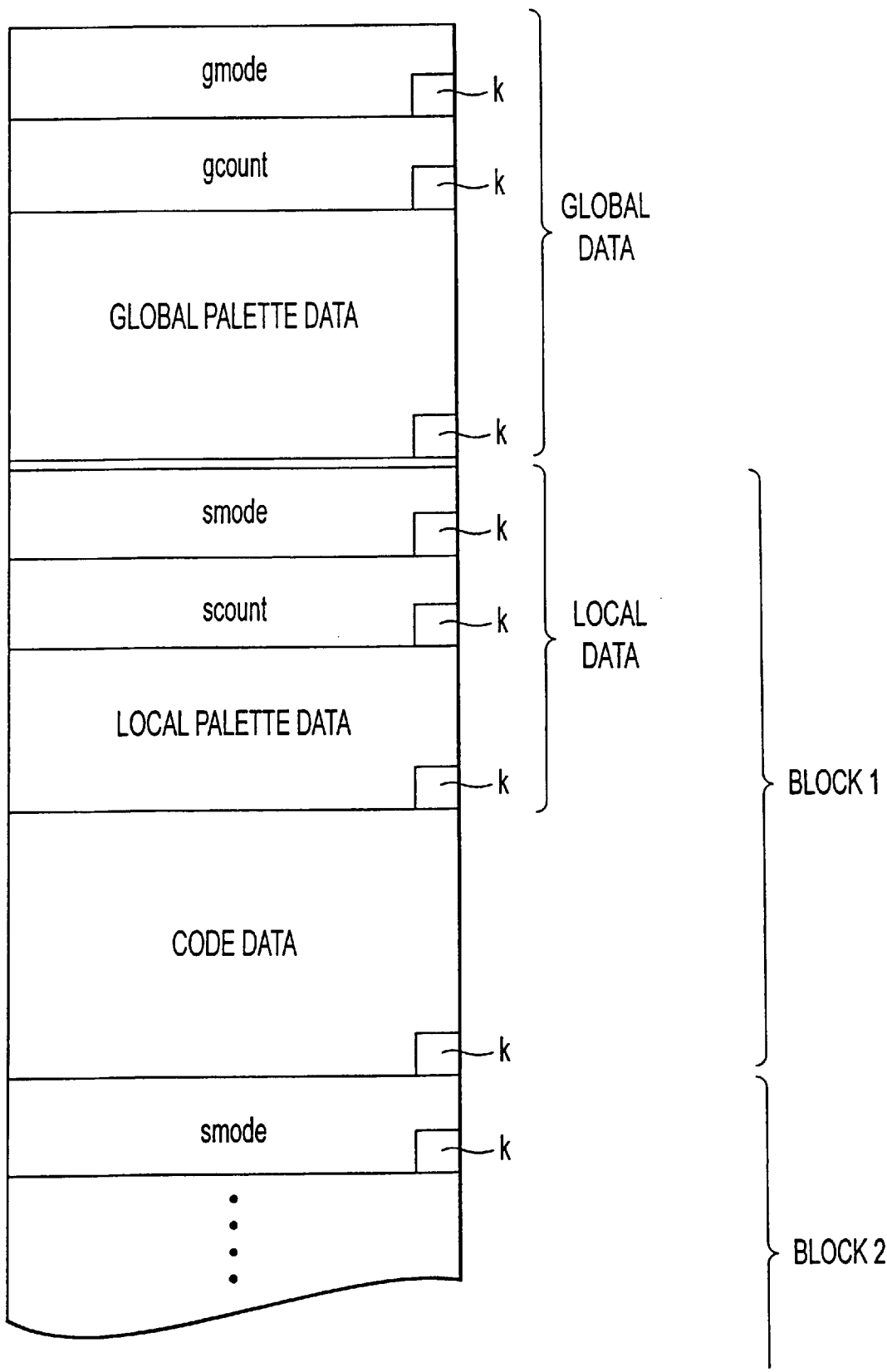
FIG. 11 is a diagram showing the structure of the data which is formed by the color image encoding device of FIG. 1.
Figure 12A:
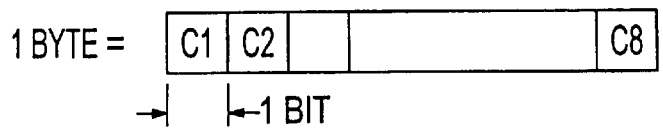
Figure 12B:
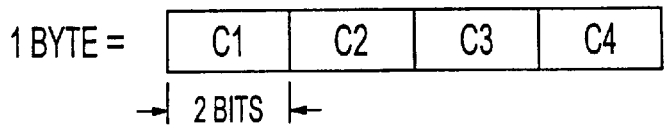
Figure 12C:
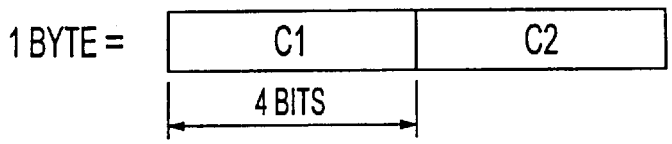
Figure 12D:
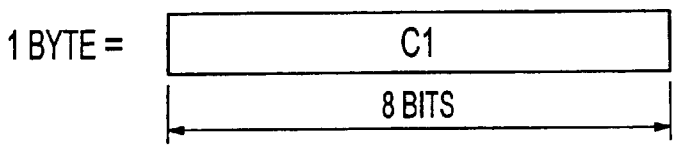
Figure 13:
FIG. 13 is a diagram showing the structure of the run-length data which is formed by the color image encoding device of FIG. 1.

The encoding is performed as described above. The data configuration is as shown in FIG. 11. In other words, the global data which includes the g mode, the g count and the global palette data comes first, and next comes the local data which includes the s mode, the s count and the local palette data. Then comes the code data of block 1, which is the code data of the color index C and the L1 data and the L2 data, or code data which shows each value of the color index C and the run L. Moreover, the local palette data is not formed when the s mode=the g mode. After the block 1, the data of the block 2, which is same as the block 1, comes. After this, the data of each block is arranged as block 3, 4 . . . .

Moreover, since each data is expressed as the bits of "0" and "1" and the completed portion of each data cannot be determined, the key data K which shows the completed portion of each data is added to the last of each data.

When it is s mode=1, in the code data, as shown in FIG. 12 (A), C1, C2 . . . , which are color indexes become 1 bit each, and 8 pixels can be displayed with one byte. Moreover, when s mode=2, each color index C1, C2 . . . become 2 bits, and the display of 4 pixels is possible with one byte. Similarly, when s mode=4, it becomes 1 pixel per 4 bit display, and it becomes a 2 pixel display with 1 byte. Moreover, when s mode=8, it becomes 1 pixel per 8 bit display, and it becomes only a 1 pixel display with 1 byte. Moreover, when s mode=5, 6, 7, similarly, it is displayed with 1 pixel per 5 bits, 6 bits or 7 bits.

Including the code data, each data is surrounding reference pixel modeled or the run length modeled. When it is run length modeled, the maximum run number is 16 in the present embodiment. Because of this, the run length data, as shown FIG. 13, can show one run with 4 bits. Moreover, this run number may be arbitrary, but when the horizontal size of 1 block is 32 pixels, approximately 16 pixels is preferable.

Figure 14A:
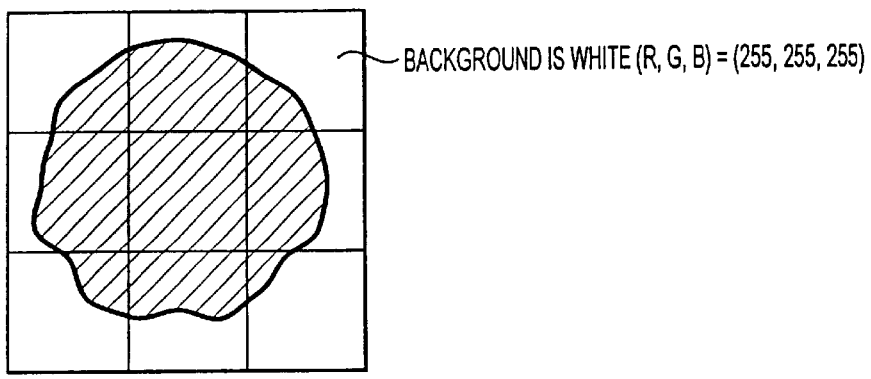
Figure 14B:
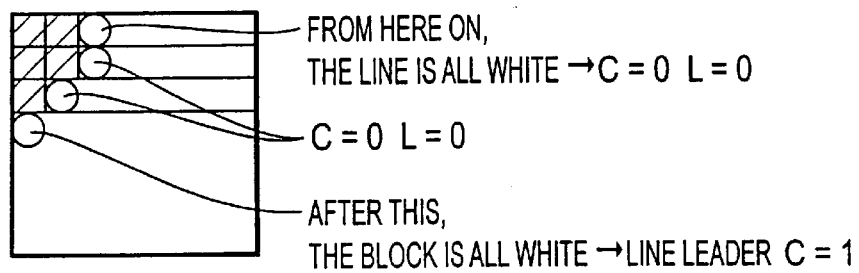

Moreover, when encoding, when the specified color continues, if the following special processing which is shown below is added, the data amount is compressed and becomes better. For example, in the case of an entire image in which the background is white as shown in FIG. 14 (A), when the block of the right lower corner is processed, at the position of each line at which white begins, the codes of C=0 and L=0 are allotted, which show that all portions of the line after this portion are white, as described above. Moreover, when an entire line and all lines thereafter are white, the code of C=1 is similarly allotted at the head of the line. By allotting these codes, the number of colors which can be used decreases by two, but the point of data compression becomes extremely effective. This kind of processing can be adopted for other colors, not only when the background is white.

Figure 15:
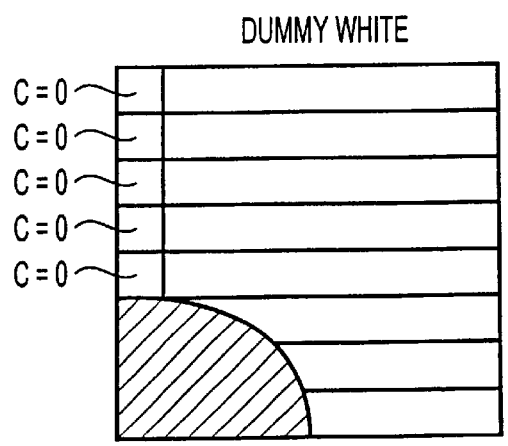
FIG. 15 is a diagram explaining the processing method when processing a specific image by the color image encoding device of FIG. 1 and the example which processes other kinds of blocks.

Moreover, as shown in FIG. 15, when a certain image occurs after white continues in a specified block, the code of C=0, which means white, can be allotted at the head of each line as a dummy white, and it can be designated that each line is all white.

Figure 16:
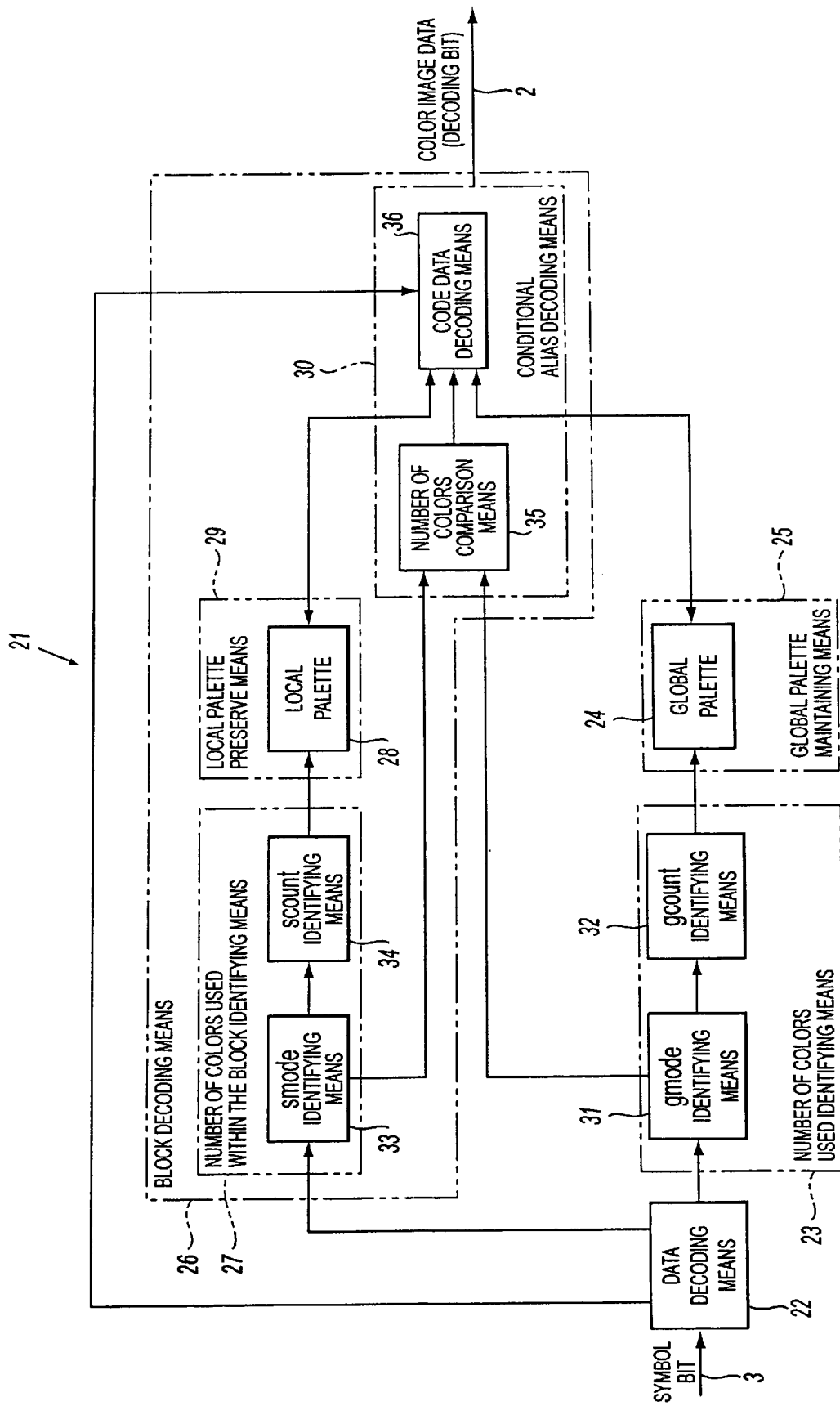
FIG. 16 is a function block diagram of the color image decoding device of an embodiment of the present invention.
Figure 17:
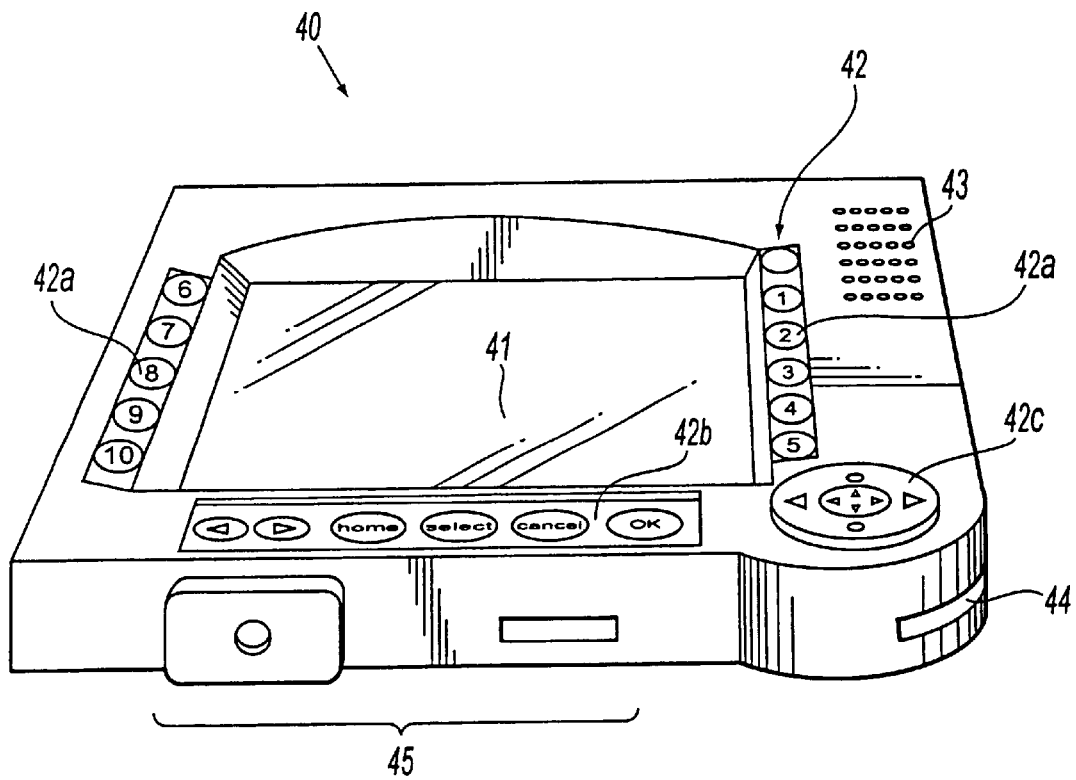
FIG. 17 is an oblique view showing an example of a portable terminal display device in which the color image decoding device of FIG. 16 is assembled.

Next, the color image decoding device and decoding method are explained based on FIG. 16.

The color image decoding device 21 of the present embodiment comprises data decoding means 22 which inputs the encoding bit 3 and performs the run length decoding while dividing up the data, number of used colors identifying means 23 which identifies the number of used colors of the entire decoded color image data, global palette maintaining means 25 which maintains the global palette in which are listed indexes corresponding to each color when the number of used colors is a predetermined value or less, and block decoding means 26 which divides the color image data into a plurality of blocks, and decodes the encoding bit 3 that becomes the encoded data for every block. In addition, the global palette 24 is similar to the local palette 5 which is shown in FIG. 2.

The block decoding means 26 comprises number of colors in a block identifying means 27 which identifies the number of colors in a divided block, local palette maintaining means 29 which maintains the local palette 28 which lists indexes of the global palette 24, and conditional alias decoding means 30 which, when the number of number of colors which is identified by the number of colors in a block identifying means 27 is less than the number of colors in the global palette 24, calls out the column which corresponds to the local palette 28 which lists indexes of the global palette 24 from the values of the decoded color indexes and decodes the color of the global palette 24 which is described in the local palette 28, and, when the number of colors which is identified by the number of colors in a block identifying means 27 is the same as the number of colors in the global palette 24, directly decodes the colors in the global palette 24 from the values of the decoded color index values.

Figure 20A:
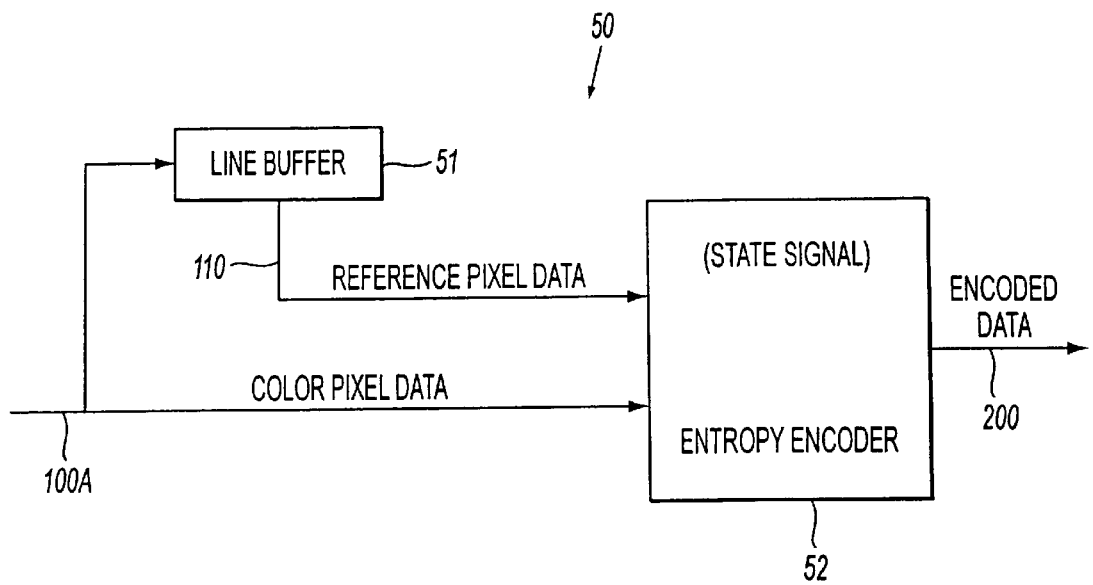
Figure 20B:
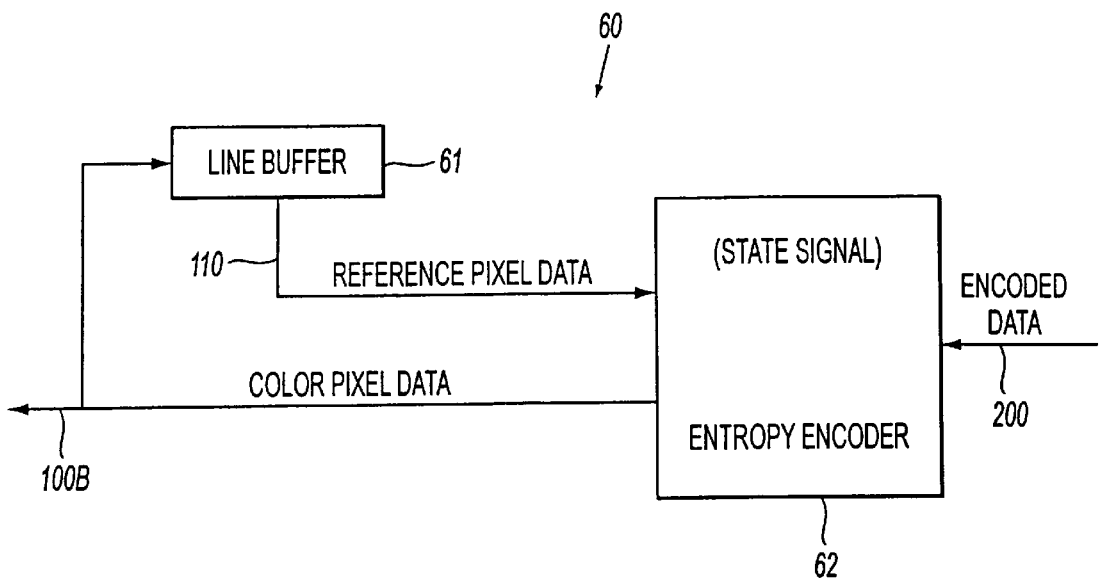
Figure 21:
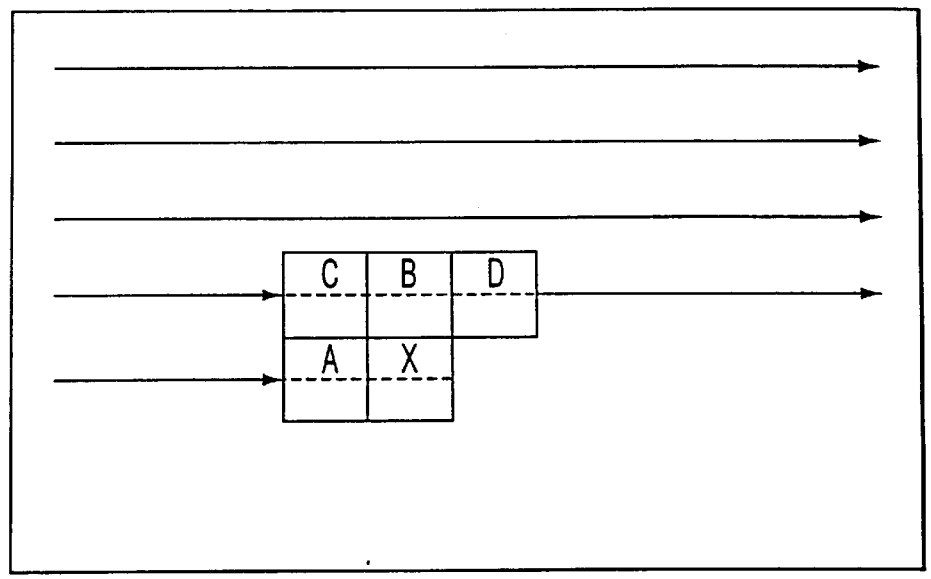
FIG. 21 is a diagram explaining the state where the image is raster-scanned in the multi-color encoding system of FIG. 20.

Moreover, the data decoding means 22 also functions as the entropy decoding means as shown in FIG. 20. Moreover, the local palette 28 is same as the local palette 8 which is shown in FIG. 3.

Figure 19:
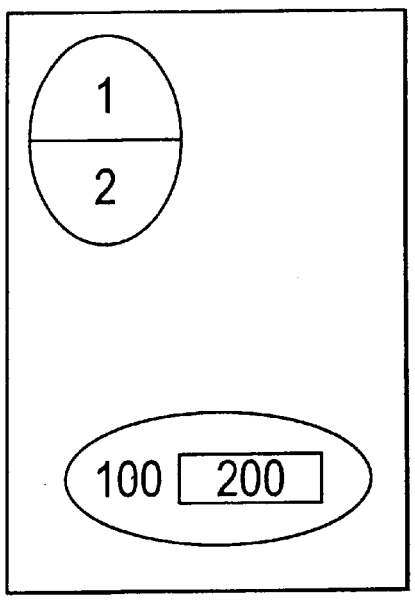
FIG. 19 is a diagram explaining the characteristics of the multi-color image and the palette chart which are used in a conventional device and the present invention.

Here, the number of used colors identifying means 23 has g mode identifying means 31 which identifies the g mode and g count identifying means 32 which identifies the g count. Moreover, the number of colors in a block identifying means 27 has s mode identifying means 33 which identifies the s mode and s count identifying means 34 which identifies the s count. Further, the conditional alias decoding means 30 has color comparison means 35 which compares the g mode and the s mode and the code data decoding means 36 which decodes the index of the corresponding color using the value of the decoded code data, the local palette 28 and the global palette 24 and outputs the color image data 2 of the multi-color image. Moreover, for the decoded color image data 2, the essential color is decoded based on the palette (not shown in the Figure) which corresponds to the palette table of FIG. 19.

Moreover, the color image data 2 is decoded by the reverse algorithm of the encoding method which is discussed above. In other words, it comprises a number of used colors identifying step that identifies the number of used colors in the entire color image data which is to be decoded, a global palette calling step which when the number of used colors is a predetermined value or less, calls out the global palette 24 in which indexes that correspond to each color are listed and a block decoding process which divides the color image data into a plurality of blocks and decodes the encoding bit 3 which is the encoded data for each block.

The block decoding step has a number of colors in a block identifying step which identifies the number of colors in a divided block, and a conditional alias decoding process which, when the number of colors which is identified by this number of colors in a block identifying process is less than the number of colors of the global palette 24, calls out the column which corresponds to the local palette 28 which lists the indexes of the global palette 24 from the decoded color index values and decodes the color of the global palette 24 which is described in the local palette 28, and, when the number of colors which is identified by the number of colors in a block identifying step is the same as the number of colors in the global palette 24, directly decodes the colors in the global palette 24 from the decoded color index value.

Also, in the present embodiment, the predetermined value is 256 colors, and the size of one block is 32×32 pixels. Accordingly, based on similar rules to the algorithm at the time of the encoding, the color image data 2 is obtained from the encoded bit 3 by using the algorithm for decoding.

Figure 18:
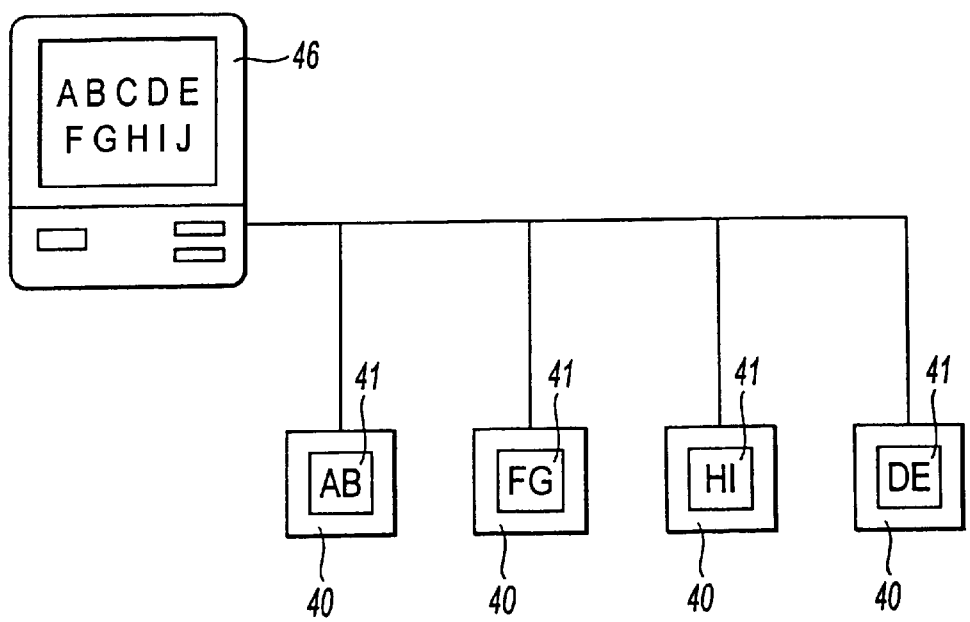
FIG. 18 is a diagram explaining an example of a system in which the portable terminal display device of FIG. 17 is used.

One example of a display device in which this kind of color image decoding device 21 is assembled is shown in FIG. 7 and FIG. 18. This display device is a portable terminal display device 40, and mainly includes a display part 41 at the center which is made by liquid crystal, an operating part 42 which is arranged around the display part 41, a speaker part 43 which outputs sound, a magnetic card reader part 44 in which a magnetic card which can access a specified web page is inserted and which reads in the address of the card, and which also reads in other magnetic cards, and a connecting part 45 which is connected to a power line and is a host PC.

The left and right operating parts 42 of the display part 41 have 10 kinds 1~10 of the menu buttons 42a. The corresponding operating menu is displayed on the display part 41 which is adjacent to these buttons 42a. For example, various animations stored in the personal computer can be selected by the numbers. In other words, when the first menu button 42a is pressed, the first animation is replayed. Moreover, at the lower side of the display part 41, various operation button part 42b are arranged to be used when accessing a web page on the Internet. Moreover, the designation operating part 42c for moving the controlling arrow on the screen up and down and left and right is provided in the vicinity of the magnetic card reader 44.

One example of the way of using the above-mentioned portable terminal display device 40 is shown in FIG. 18. A plurality of portable terminal display devices 40 are connected to the personal computer 46. In the PC 46, the image is displayed using the entire screen. However, in each portable terminal display device 40, only one part of the image is displayed. On each portable terminal display device 40, a part of the screen on the PC is scrolled by a scrolling function, and the entire content of the screen can be grasped. Moreover, the compression method of the portable terminal display device 40 can be replayed by just software, and exclusive hardware is unnecessary, resulting in minimization of the size and lowering of the sale price.

Furthermore, as shown in FIG. 18, the entire image does not have to be decoded, and the memory for display can be minimized since only one part of the image is displayed instead of displaying the entire image of the PC 46. Moreover, it is also acceptable to change the size of the memory for display and the panel for display depending on the portable terminal display device 40. For example, it is acceptable that one portable terminal display device 40 be able to display "A B C D", another portable terminal display device 40 be able to display "A B", and further, another portable terminal display device 40 only be able to display "A". This color image decoding device 21 and portable terminal display device 40 has a simple and minimized structure, and performs lossless decoding.

In the above-mentioned embodiment, the replay speed becomes faster due to the decoding. Moreover, it is unnecessary to decode the entire image, and to decode only the blocks which are necessary for the display. In addition, simple and lossless decoding becomes possible. Moreover, the block size may be arbitrary. When it is 32×32 pixels, it is 1024 colors at the maximum value, and stays in the 256 colors normally. Moreover, the run number at the time of the run length encoding can be 4 bits, and the encoding efficiency and the decoding efficiency are good.

Moreover, the above-mentioned embodiment is an appropriate example of the present invention. However, the present invention is not limited to this, and modified operations are possible without deviating from the range of this summary. For example, the block size can be a square block of 16×16 pixels, 64×64 pixels or the like instead of 32×32 pixels, can be a horizontally long rectangular when the run number is large. There may be various sizes and shapes of blocks.

Moreover, it is desired that the block size be not too large since it is preferable that the local palette 28 in the color image decoding device 21 be a lower mode than the global palette 24. In other words, it is desirable to have from 16×16 pixels to 64×64 pixels.

Furthermore, in the above-mentioned present embodiment, 256 colors are adopted as the specified value. However, the value is appropriately changeable depending on the number of used colors or the like in the original image. Moreover, the present invention can be adopted for the encoding and the decoding of a natural image. In addition, in the above-mentioned present embodiment, when the g count exceeds 256 colors, the present invention is not adopted for the part of the entire image, by performing no processing or by not creating the global palettes 5 and 24. However, it is also acceptable to create the global palettes 5 and 24 for the processing of the entire image by selecting the maximum number of used colors in the multicolored image as the specified value.

Moreover, as the above-mentioned present embodiment, when the specified value is 256 colors, when there is an image which exceeds 256 colors, and the present invention is adopted after thinning out the colors of the image and making it to be 256 colors or less. In this case, it becomes non-reversible processing instead of lossless.

Moreover, the above-mentioned present embodiment includes the global palettes 5 and 24 and the local palettes 8 and 28. However, a device which has only the global palettes 5 and 24 has a specific effect and a device which has only the global palettes 8 and 28 has another specific effect, and both are preferable compared to a conventional device.

Moreover, in the above-mentioned present embodiment, the surrounding reference pixel modeling and the run-length modeling are adopted, but it is also acceptable to adopt other encoding models such as the Markov model, prediction encoding, DCT or sub band encoding. Moreover, for the entropy encoding means 12 and the entropy decoding means, various kinds of encoding such as the calculation encoding, the Hoffman encoding or the like are appropriately adopted. Moreover, the switching of the modeling and the adoption of the copy mode can be adopted to a device which simply block divides the image. By adopting these kinds of devices encoding and decoding optimal to each part of the image become possible.

Moreover, the color image decoding device and decoding method of the present invention are adopted to the terminal display device of a restaurant or chain food stores, or are adopted in various portable terminal display devices of terminal display devices or the like when accessing a web page on the Internet, or other display devices.

As explained above, in the color image encoding method and device, the data which becomes the object of encoding is significantly reduced and it is possible to minimize the data capacity. Because of this, it is possible to use a simple compression method and improve the refresh rate. Moreover, prior to the image display, it is possible to decode only the blocks which are needed for display, and to minimize the memory required for display.

Furthermore, in the color image decoding method and device, the data amount of the color used for decoding is significantly reduced and it is possible to use a simple decoding method. Because of this, it is possible to improve the refresh rate. Furthermore, it is not necessary to decode the entire image, and it is acceptable to reproduce only the blocks which are needed for display. As a result, it is possible to minimize the memory for display, miniaturize the decoding device which uses the decoding method, and reduce the cost.

What is claimed is:

1. A color image encoding method which inputs and encodes color image data, comprising the steps of:

counting the number of colors used in the input color image data;

creating a global palette in which indexes corresponding to respective colors are listed when the number of colors used is a predetermined value or less;

dividing the input color image data into a plurality of blocks;

creating a local palette in which the indexes in the global palette are listed when the number of colors in a block is less than the number of colors in the global palette;

assigning the indexes in the global palette to the input pixels when the number of colors in the block is the same as the number of colors in the global palette and which otherwise assigns the indexes in the local palette to the input pixels; and encoding the color indexes, wherein, when the predetermined value is $2^n$ (n is $2^x$ when x is an integer equal to or greater than 0), the indexes in the global palette are expressed by n bits, and when the number of colors in the block is $2^m$ (m is $2^x$ where x is an integer equal to or greater than 0), the index in the local palette is expressed by m bits, and wherein the local palette is not created when n=m, and the local palette is created when n>m.

2. The color image encoding method as set forth in claim 1, wherein the predetermined value is set at 256 colors, the specified value is set at 5, and the size of one block is set at 32×32 pixels.

3. A color image encoding method which inputs and encodes color image data, comprising:

global palette creation means for counting the number of colors used in the input color image data and creating a global palette in which indexes corresponding to respective colors are listed when the number of colors used is a predetermined value or less;

block division means for dividing the input color image data into a plurality of blocks;

local palette creation means for creating a local palette in which the indexes in the global palette are listed when the number of colors in a block is less than the number of colors in the global palette;

color index assigning means for assigning the indexes in the global palette to the input pixels when the number of colors in the block is the same as the number of colors in the global palette and for otherwise assigning the indexes in the local palette to the input pixels; and means for encoding the color indexes, wherein, when the predetermined value is $2^n$ (n is $2^x$ when x is an integer equal to or greater than 0), the indexes in the global palette are expressed by n bits, and when the number of colors in the block is $2^m$ (m is $2^x$ where x is an integer equal to or greater than 0), the index in the local palette is expressed by m bits, and wherein the local palette is not created when n=n, and the local palette is created when n>m.

4. The color image encoding device as set forth in claim 3, wherein the predetermined value is set at 256 colors, the specified value is set at 5, and the size of one block is set at 32×32 pixels.

* * * * *